United States Patent [19]
Halpin et al.

[11] Patent Number: 5,628,596
[45] Date of Patent: May 13, 1997

[54] VEHICLE-CARRYING FRAME

[75] Inventors: Terence Halpin, West Linn, Oreg.; Donald Kiive, Brush Prairie, Wash.

[73] Assignee: G & G Intellectual Properties, Inc., Portland, Oreg.

[21] Appl. No.: 407,219

[22] Filed: Mar. 20, 1995

Related U.S. Application Data

[62] Division of Ser. No. 784,902, Oct. 30, 1991, Pat. No. 5,415,505.

[51] Int. Cl.⁶ .................................................. B60P 3/08
[52] U.S. Cl. ........................... 410/29; 410/24; 410/9; 410/26; 105/372
[58] Field of Search .................................. 410/2, 3, 4, 5, 410/7, 8, 9, 10, 11, 12, 66, 16, 67, 150, 151, 29, 130, 132, 133, 153, 131, 18, 26, 24, 60, 62, 58, 143–149; 105/243, 370–372; 220/529, 534, 540, 541, 542, 544, 545, 546, 547, 549, 550, 1.5; 414/400, 345, 498, 499, 500

[56] References Cited

U.S. PATENT DOCUMENTS

| | | |
|---|---|---|
| 362,453 | 5/1887 | Lozier . |
| 1,230,484 | 6/1917 | Howd ..................................... 105/371 |
| 1,766,289 | 6/1930 | Doud et al. . |
| 1,824,369 | 9/1931 | Reid et al. ............................... 410/24 |
| 1,869,054 | 7/1932 | Evans . |
| 1,892,589 | 4/1932 | Snyder . |
| 2,036,212 | 4/1936 | Gwatkin . |
| 2,155,872 | 4/1939 | Reifer . |
| 2,593,174 | 4/1952 | O'Dell . |
| 3,308,845 | 3/1967 | Bellas et al. . |
| 3,667,635 | 6/1972 | Hackney . |
| 3,680,492 | 8/1972 | Weage . |

(List continued on next page.)

FOREIGN PATENT DOCUMENTS

| | | | |
|---|---|---|---|
| 5960 | 12/1979 | European Pat. Off. | .............. 105/372 |
| 437413 | 7/1991 | European Pat. Off. . | |
| 46-15524 | 4/1971 | Japan . | |
| 56-4584 | 1/1981 | Japan . | |
| 57-30310 | 7/1982 | Japan . | |

OTHER PUBLICATIONS

"A New Way to Move Cars," Marples Business Newsletter, May 10, 1989, p. 4.
"Greenbrier's Auto–Stack Joins Maxi–Stack," (1989).
"Down Mexico Way," Cargo Systems, Oct. 1989, p. 37.
Cargo Systems, Jun. 1990, p. 39.

(List continued on next page.)

*Primary Examiner*—Frank E. Werner
*Attorney, Agent, or Firm*—Chernoff, Vilhauer, McClung & Stenzel

[57] ABSTRACT

An exemplary frame for carrying two or more tiers of vehicles within a standard cargo-carrying container includes frame-supporting wheels rotatably supported in interposed relation between the sides of the lower rail of the frame for streamlined operation. Installing structure included on the upper and lower rail of the frame, such as an upper and lower plate each having a toothed edge, enable selective coupling of a vertical tension member to the upper and lower rails either in a first suspended position in which longitudinal movement along the respective rails is possible or in a second suspended position locked against such movement. The exemplary frame also includes a storage mechanism where each vehicle-supporting wheel cradle is pivotable about a load-bearing hanger for securement in a storage position extending parallel to the sides of the frame. Also included is a mechanism for limiting longitudinal movement of the frame inside a container, which includes a head selectively extensible in a direction longitudinal of the frame toward an interior margin of the container. Preferably the head also pivots transversely for engagement of the head with a respective side wall of the container so that, in conjunction with a like mechanism operating on a separate frame, the ends of a number of collapsed frames may be securely held in transversely clamped condition within a single container.

10 Claims, 13 Drawing Sheets

U.S. PATENT DOCUMENTS

| | | | |
|---|---|---|---|
| 3,911,832 | 10/1975 | Vandergriff | 105/372 |
| 3,931,895 | 1/1976 | Grimaldo . | |
| 4,455,119 | 6/1984 | Smith | 414/537 |
| 4,597,712 | 7/1986 | Smith | 414/549 |
| 4,668,141 | 5/1987 | Petersen . | |
| 4,668,142 | 5/1987 | Fity et al. . | |
| 4,738,575 | 4/1988 | Blodgett et al. | 410/29 |
| 4,759,668 | 7/1988 | Larsen et al. . | |
| 4,768,916 | 9/1988 | Gearin et al. . | |
| 4,786,222 | 11/1988 | Blodgett | 410/29 |
| 4,797,049 | 1/1989 | Gearin et al. . | |
| 4,919,582 | 4/1990 | Bates et al. . | |
| 4,957,407 | 9/1990 | Gearin . | |
| 4,963,067 | 10/1990 | Gearin et al. . | |

OTHER PUBLICATIONS

"Greenbrier Starts Testing Cars–In–Container System," Daily Shipping News, Mar. 14, 1991, p. 3.

"Burlington Northern, Greenbrier Expand Autostack Evaluation Process," Intermodal Reporter, Mar. 11, 1991, p. 168.

"Autostack Gets First Commercial Test, by Ford & Nissan," Railway Age, Mar. 1991.

"Automakers Tell U.S. Railroads to Improve Service or Risk Business Loss," Traffic World, Mar. 25, 1991, p. 7.

"Union Pacific's Quality Conference," Railway Age, Apr. 1991, p. 72.

"Look Ma, No Hands," (photo), The Oregonian, Apr. 12, 1991.

"Greenbrier Unveils Autostack," American Shipper, Apr. 1991, p. 59.

"BN Testing Greenbrier's New Autostack System," Progressive Railroading, Apr. 1991, p. 9.

"Cars in Boxes: A Smoother, Safer Ride," Container Management, May 1991.

"Going With Autostack," Cargo Systems, May 1991.

"Autostack System Does Well In Early Testing, Ford Says," The Journal of Commerce, Sep. 30, 1991.

"Car Containerization Might Gain Niche Market, Industry Experts Say," The Journal of Commerce, Oct. 16, 1991.

"Containerization Automobiles Seen as Wave of the Future," The Journal of Commerce, Dec. 9, 1991.

"The Autostack System, A Better Way to Ship Cars!," a product brochure, Nov. 1990 (approximately), The Greenbrier Companies, Lake Oswego, Oregon (4 pages).

Videocassette as Released on or About Apr. 1991 by The Greenbrier Companies, Lake Oswego, Oregon.

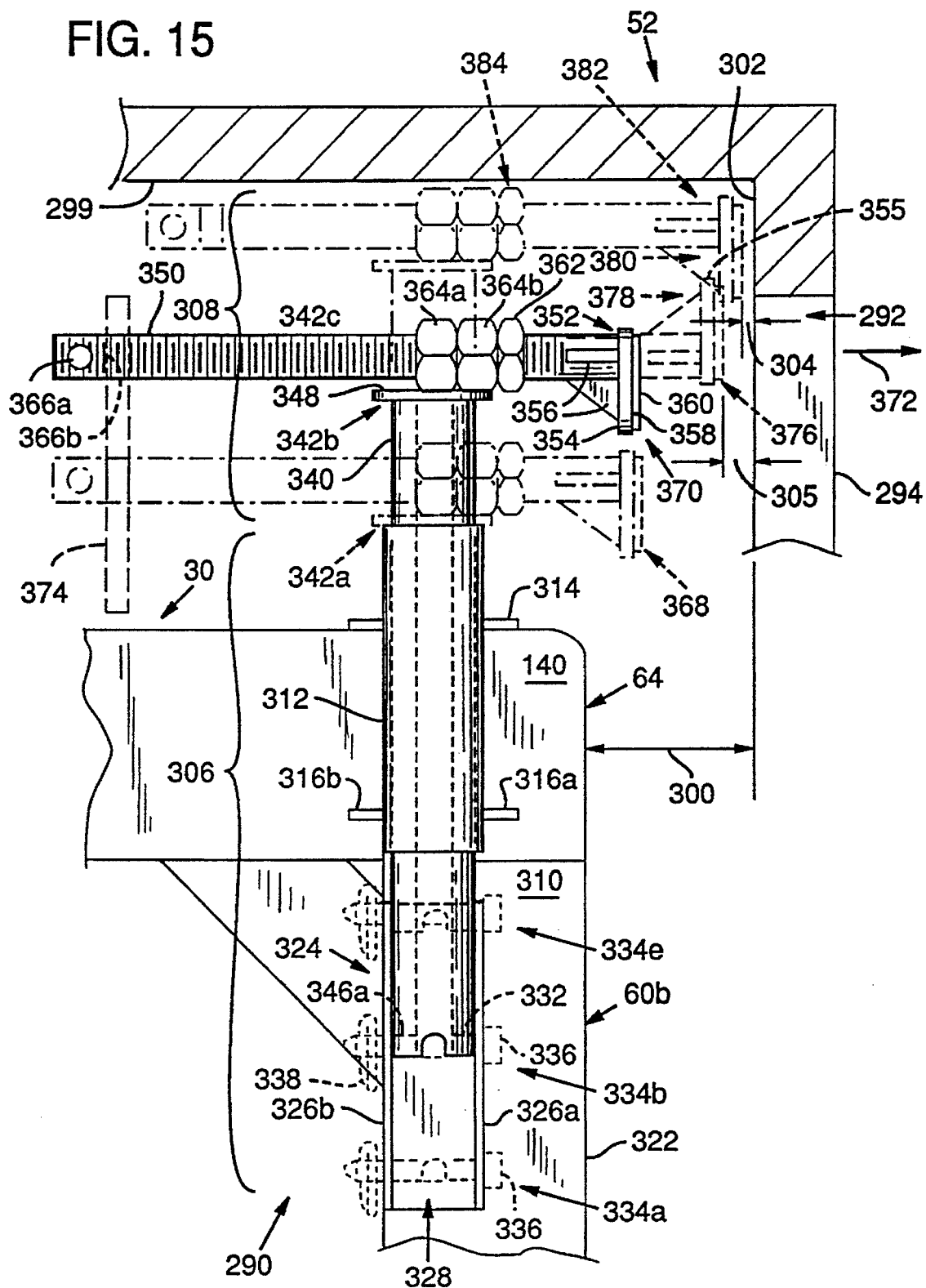

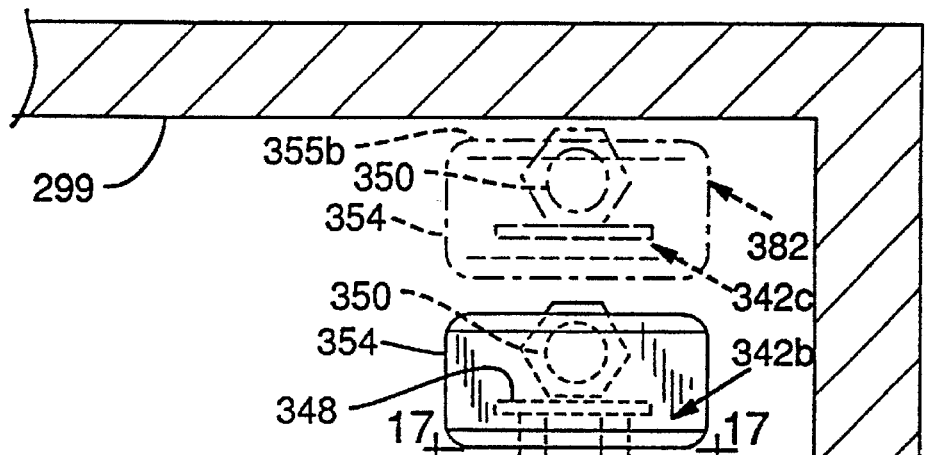
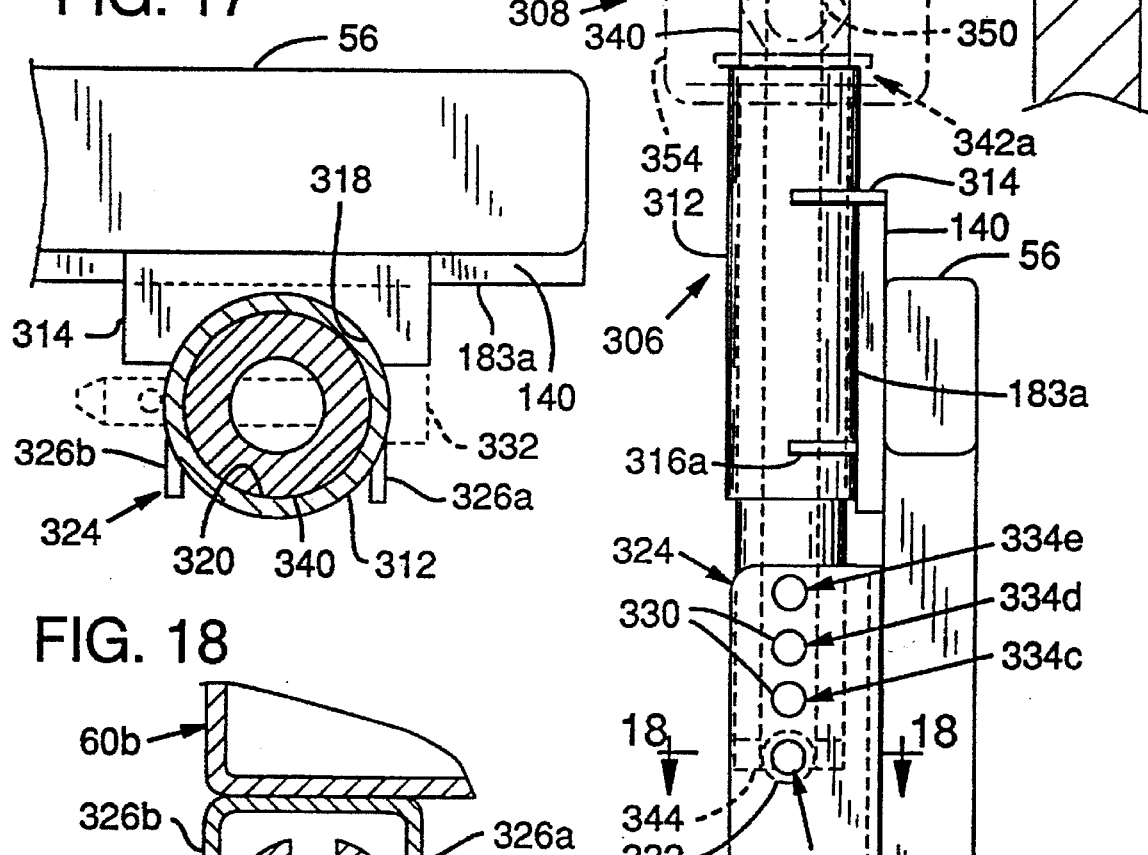
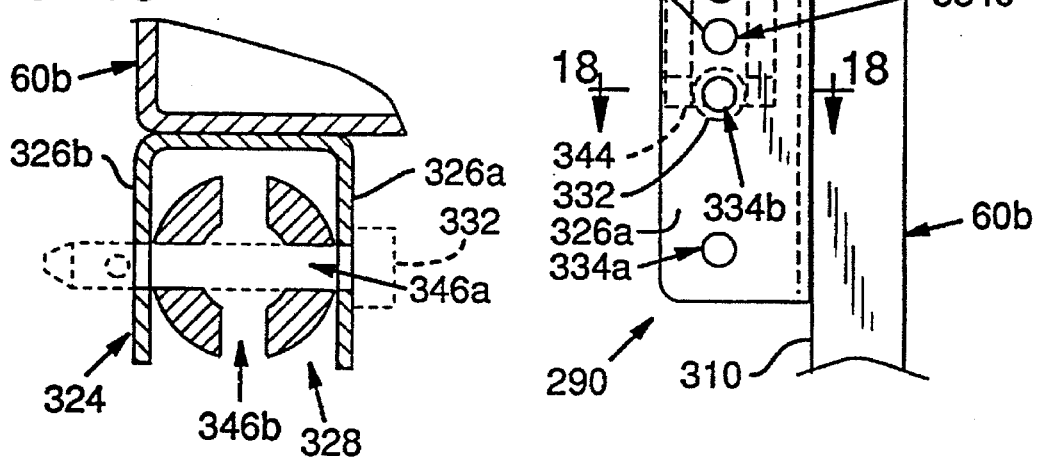

VEHICLE-CARRYING FRAME

This application is a division of application No. 07/784,902, filed Oct. 31, 1991, now U.S. Pat. No. 5,415,505.

BACKGROUND OF THE INVENTION

The present invention relates to improvements in elongate frames of the type which have a generally open-sided construction making possible the loading of two or more tiers of vehicles onto the frame and which, after being loaded, are adapted for insertion into a standard cargo-carrying container for shipment.

One such type of frame which was found, in practice, to be particularly versatile and easy to use is shown in Gearin et al., U.S. Pat. Nos. 4,768,916; 4,797,049; and 4,963,067. In this type of frame, the forward and rearward pairs of wheels of each vehicle were each supported on a corresponding wheel support or cradle which was engaged, at each end, so as to extend across the transversely-spaced upright sides of the frame and which had, at each end, a spaced-apart pair of elongate beams which together supported a respective tire of the vehicle. A related type of wheel cradle was also described in Fity, U.S. Pat. No. 4,668,142. As a result of this arrangement, the same wheel cradle could support vehicles which differed from each other in the amount of side-to-side spacing each had between their respective wheels.

The prior Gearin et al. frame further included a hanger assembly that coupled each end of each respective wheel cradle to the frame. Each hanger was slidable along a corresponding vertical post selectively mountable to a respective side of the frame. This allowed the vehicle to be raised and lowered and even tilted within the frame by means of the hanger assemblies which themselves were conveniently accessible at the sides of the frame. Companion patents Bates et al., U.S. Pat. No. 4,919,582 and Gearin et al., U.S. Pat. No. 4,957,407, described alternative forms of the hanger assembly, including a type which pivoted clear of the center space of the frame to allow a tier of vehicles to be moved into the frame on an upwardly moving platform.

An additional feature of the Gearin et al. frame was suspension of the posts from the upper sides of the frame so that respective pairs of the posts were freely moveable longitudinally toward and away from each other. This permitted the frame to be easily adapted to vehicles of differing wheel base.

Yet another feature of the Gearin et al. frame was its inwardly foldable end by means of which the laterally-spaced sides of the frame could be brought together into a closely adjacent collapsed position. A full description of this feature was provided in Gearin et al., U.S. Pat. No. 4,768,916, which patent was incorporated by reference in U.S. Pat. NO. 4,963,067. This space-conserving feature permitted reshipment of a number of collapsed frames, in side-by-side relationship, back to their original loading center in a single cargo container.

Despite the general versatility of the Gearin et al. frame, however, difficulties in using the frame were still encountered.

For example, depending on the size of the vehicles being loaded, the frame would receive either a greater or lesser number of vehicles, so that a certain number of the wheel cradles reserved for a particular frame could remain unused during a given shipment. To keep these wheel cradles together with their frame, various tie-down procedures were employed. These procedures, however, relied heavily on the cable-tying expertise of the loading team so that if an inexperienced team was involved, certain of the unused cradles were likely to come loose from the frame, with possible risk of damage to the vehicles which were being shipped on the frame. Moreover, due to their length, rigidity, and weight, the wheel cradles were cumbersome to move about and could, when improperly handled, produce back sprain and other injuries.

Other difficulties were encountered in installing the vertical posts along the sides of the frame. To support each vehicle, a pair of posts were needed along each side. Each post of the pair was suspended from the upper side rail and at least one of the pair was slidably moved along the upper side rail to set the spacing between the posts in accordance with the wheel base of the vehicle that was being loaded. After being suitably positioned, each post was then locked to the frame by an upper and lower pin. Specifically, the upper pin was passed between an upper hole in each post and a respective one of a series of longitudinally-spaced holes in the upper side rail. The lower pin, likewise, was passed between a lower hole in each post and a corresponding one of a series of longitudinally-spaced holes in the lower side rail. In pinning each post, however, it would sometimes happen that the hole selected in the lower side rail did not correspond exactly with the hole selected in the upper side rail, causing the post to tilt slightly away from the vertical. Frequently, this tilt went undetected until a number of vehicles had been loaded, making it necessary to then unload these vehicles and to repeat the loading sequence again.

To maintain the upper pin in locking position, in one early approach an L-shaped upper pin was used, the outside leg of the pin being retained in place against the post by a hairpin clip drawn across two outwardly projecting lugs. This approach, described in Gearin et al., U.S. Pat. No. 4,768,916, required the manipulation of multiple elements (i.e., the pin and clip) to secure the upper end of the post in locked position and therefore was time-consuming to implement. A more recent and faster prior art approach, shown herein in FIG. 1, utilized an L-shaped upper pin 22 with an outside leg 24 that could be pivoted into locking position behind a spring clip 26, the spring clip being permanently riveted to the upper end 27 of the vertical post 28. To unlock the upper end of the post using this approach, it was first necessary to force the spring clip back to release its grip on the outside leg of the upper pin. Unfortunately, however, there was a tendency to apply too great a force to the clip causing the clip to break off from the post.

The lower pin, passing through a plate formed at the lower end of each post, was maintained in locking position by gravity due to its downward orientation. It was found, however, that laterally outward forces were acting on the loaded posts, and that these forces, acting against the lower pins, were wearing down and enlarging the holes which had been drilled for the lower pins in the plate of each post. This, in turn, resulted in chattering of the loaded posts against the frame and increased the likelihood of vibrational damage occurring to the vehicles during their shipment.

In installing the vertical posts, it was sometimes found, particularly when loading vehicles of larger size, that a particular pair of longitudinally-spaced posts were not movable sufficiently far apart to receive a certain one of the vehicles. Often this occurred because movement of the lower end of one of the posts was blocked by the squat sides of a frame-supporting wheel box, there being one such wheel box located beneath each of the fixed vertical columns which supported each upper side rail. The squat shape of each wheel box was attributable to the fairly large width of each frame-supporting wheel. It was believed that wheels of a smaller width would not support the frame with sufficient stability and also that they would bear against the floor of the container with too much pressure when the frame was fully loaded, causing possible damage to the floor. Accordingly, it did not appear feasible to merely reduce the width of each wheel and each corresponding wheel box in order to obtain a greater range of movement for the posts. Nor was it clear how best to modify the lower end of the post to overcome this problem without limiting the side-to-side spacing available for the wheels of the vehicles which were to be loaded on the frame.

A further difficulty was encountered in that the separate pieces of lower side rail which were used to join together each pair of wheel boxes not only were required to have each of their ends securely attached, as by welding, to a respective wheel box but, at the same time, were required to be in near perfect end-to-end alignment with each other, so that highly skilled and costly processing was involved in manufacture of the frame.

Finally, it was found that excessive movement of the vehicle-loaded frame within the cargo container was likely to occur during transport of the container, particularly parallel to the wheels of the frame in the longitudinal direction of the container. With each resulting impact between the interior ends of the container and the frame, damage to either the container or the vehicles loaded on the frame was possible. Although the use of removable cushioned inserts between the frame and the ends of the container could have prevented such movement, such inserts were time-consuming to install and were able to work loose during shipment.

An alternative approach, suggested by Hackney, U.S. Pat. No. 3,667,635, involved the use of a telescoping locking bar having an opposed pair of biasedapart ends. This approach required that the rear corners of the cargo container be specially modified in order to selectively receive the ends of the bar, so that the transversely extending bar could hold the frame in a fixed position forward of the rear corners. If, however, the frame was to be shipped using preexisting modes of transport (e.g., by rail car, ship, and truck), this approach was unworkable because with each such mode only cargo containers of the standard type were generally available.

A related problem involved excessive transverse movement of the frames within the cargo container during return shipment, that is, while a number of the frames were in side-by-side collapsed condition, the primary risk here being one of damage to the sidewalls of the container.

Accordingly, an object of the present invention is to provide a vehicle-carrying frame having an improved mechanism for handling and storing wheel cradles.

A related object of the present invention is to provide a storage mechanism for wheel cradles in which the risk of operator injury is minimized.

Another related object of the present invention is to provide a storage mechanism for wheel cradles in which the risk of damage to vehicles is minimized.

Yet another related object of the present invention is to provide a storage mechanism for wheel cradles that performs reliably regardless of the level of expertise of the personnel who operate the mechanism.

A further object of the present invention is to provide an improved mechanism for installing vertical posts along the sides of the frame.

A related object of the present invention is to provide an installing mechanism which ensures that each post extends properly in a vertical direction.

Another related object of the present invention is to provide a post installing mechanism which operates quickly and conveniently.

Yet another related object of the present invention is to provide an installing mechanism that is not prone to breakage.

Still another related object of the present invention is to provide a post installing mechanism which reduces the likelihood of damage occurring to vehicles in transport on the frame.

Still another object of the present invention is to provide a mechanism that increases the number of vehicle loading patterns supported by the frame.

A further object of the present invention is to provide an improved mechanism for obtaining wheeled movement of the frame.

A related object of the present invention is to provide a movement mechanism that will operate with stability and safety on a wide variety of floor-type surfaces.

Another related object of the present invention is to provide a movement mechanism that simplifies manufacture of the frame.

Yet another object of the present invention is to provide an improved mechanism for reducing movement of the frame inside its container during shipment.

Another related object of the present invention is to provide a movement reducing mechanism that will operate inside the container when the frame, in its empty and collapsed condition, is loaded side-by-side with other frames.

SUMMARY OF THE PRESENT INVENTION

In achieving the aforementioned objects, the present invention includes a first mechanism on the frame for supporting each wheel cradle in either a vehicle supporting position extending between and generally perpendicular to the upright sides of the frame or in a storage position extending adjacent to and generally parallel with one of the upright sides. Preferably the mechanism includes a pivotal load-bearing hanger for supporting a first end portion of the wheel cradle while enabling the opposite end portion to be pivoted upwardly about the first end portion so as to position the wheel cradle in the storage position. As a result, each wheel cradle can be safely stored for transport following a straightforward procedure in which only half the weight of each wheel cradle is required to be lifted in moving the wheel cradle from the vehicle supporting position to the storage position.

A second aspect of the present invention includes a second mechanism on the frame for coupling the vertical posts to the upper and lower side rails so that each vertical post is alternately movable between a first suspended position, in which the respective end portions of each post are movable longitudinally of the upper and lower side rails, respectively, and a second suspended position, in which the respective end portions of each post are locked against movement longitudinally of the respective side rails. In allowing the vertical post to be locked or unlocked by a shift in its position, the second mechanism enables quick installation of the post with a minimum of removable locking elements.

Preferably, the second mechanism includes a pair of plates, each plate having a series of teeth formed along its edge, where the pair of plates are mounted, each on a corresponding one of the upper and lower side rails, with their teeth facing generally toward each other. Each post is preferably provided with an upper and lower lug which respectively fit between selected pairs of teeth of the upper and lower mounted plates. This particular arrangement minimizes the effects of laterally-acting forces on the coupling mechanism so that the ride for vehicles in shipment on the frame will be relatively vibration-free. Preferably, also, the second mechanism includes a self-locking device, relatively immune to misuse, that serves to retain the post in the second suspended position and printed indicia which identify corresponding locations between the respective teeth of the upper and lower mounted plates to ensure proper vertical orientation of each post.

A third aspect of the present invention includes a wheel-mounting arrangement involving a lower rail having longitudinally-spaced wheel locations, each wheel location including a wheel rotatably supported in interposed relation between the sides of the lower rail, and a vertical member securable to the lower rail in certain coupling locations, at least one of these coupling locations corresponding to at least one of the wheel locations. This arrangement increases the number of loading patterns which the frame will support and simplifies frame construction. Preferably, the wheel locations are arranged into groups, each group lying beneath a fixed vertical column of the frame, where the longitudinal separation between respective wheel locations within each group is substantially less than the longitudinal separation between respective ones of the groups. This enhances frame stability and prevents damage to floor surfaces.

A fourth aspect of the present invention includes a further mechanism on the frame for limiting longitudinal movement of the frame inside a container when the frame is loaded with vehicles, such mechanism including a head selectively extensible in a direction longitudinal of the frame toward the interior margin which normally borders the entryway of the container. Preferably, the head is pivotable about a vertical axis to position the head transversely for engagement with an interior side wall of the enclosure so that, in conjunction with a like mechanism operating on a separate frame and pivoted for engagement with the opposite side wall, the ends of a number of collapsed frames may be securely held, in transversely clamped condition, by such mechanisms for reshipment of the frames back to a loading center.

BRIEF DESCRIPTION OF THE DRAWINGS

FIG. 2 is a side elevational view, partially broken away, of an exemplary frame in accordance with the present invention together with, in fragmentary view, a conventional platform-mounted assembly for loading vehicles into the frame and a container for transporting the loaded frame by truck.

FIG. 5a is a detailed view of the upper coupling mechanism of FIG. 5.

FIG. 15 is a side elevational view of an exemplary rack stop mounted on the inside of the exemplary frame of FIG. 2, where successive adjustments of the rack stop, toward the sill of a standard container, are indicated by alternately dashed and dotted line views.

FIG. 16 is similar to FIG. 16 except showing an end elevational view of the rack stop.

FIG. 17 is a sectional view taken along lines 17—17 in FIG. 16.

FIG. 18 is a sectional view taken along lines 18—18 in FIG. 16.

DETAILED DESCRIPTION OF THE PREFERRED EMBODIMENT

Figure 1:
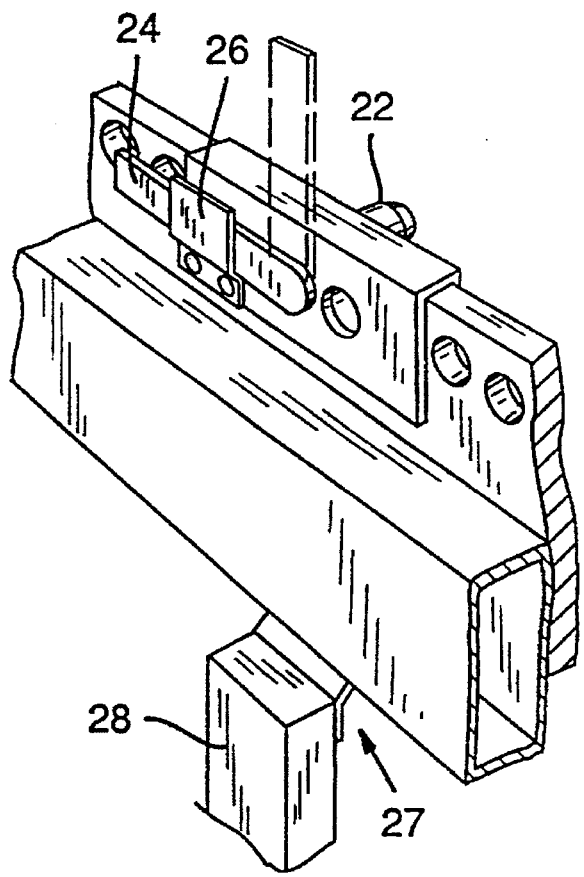
FIG. 1 is a perspective view of a conventional pinning assembly for coupling a vertical tension member to the upper rail of a frame.

Standard Environment And Aspects Of The Frame

FIG. 2 shows an exemplary elongate frame 30, in partially broken away view, constructed in accordance with the present invention for receiving two tiers of vehicles (e.g., vehicles A and B). In the view depicted, the frame 30 is supported in an elevated position on the bed 32 of a first trailer 34. FIG. 2 also shows a sled assembly 36 which can be used for positioning vehicles horizontally within the frame. Such a sled assembly is shown in Gearin, U.S. Pat. No. 4,957,407, which is herein incorporated by reference. The sled assembly 36 is supported at the same vertical level as the frame on an adjoining second trailer 38 and is selectively movable through the open central area of the frame along an inner track assembly mounted on the bed of the first trailer 34 (i.e., along paths 42 and 44 in FIG. 12).

For positioning vehicles vertically within the exemplary frame, a gantry assembly (not shown) of the type described in U.S. Pat. No. 4,957,407 can be used. This gantry assembly would operate outwardly of both sides of the frame (i.e., along paths 46 and 48 in FIG. 11) and would include, at each side, a pair of vertically movable hooks for selectively engaging a corresponding pair of latches or support hangers 50 on the frame when a vehicle within the frame was to be raised, lowered, or tilted.

After it has been fully loaded with vehicles, the exemplary frame 30 can then be moved longitudinally into a standard cargo-carrying container 52 such as of the type which is carried on the bed of a truck 54. Accordingly, in common with previous frames of its general type, the exemplary frame 30 enables the convenient, damage-free loading of multiple tiers of vehicles into a container 52 for protected transport inside the container, and similarly enables the convenient unloading of vehicles from the container.

Certain of the aspects of the exemplary frame 30 are known in the art. In particular, referring to FIGS. 2 and 11 together, the exemplary frame 30 is of a generally box-like construction and includes a pair of transversely-spaced sides 55a–b. These sides delineate the open central area 40 of the frame within which vehicles are loaded. Each side is constructed of a longitudinally-extending upper and lower rail 56 and 58, respectively, a vertical pair of corner rails 60a–b, and a number of vertical compression rails 62, where the corner rails and compression rails are used for supporting the upper rail 56 in fixed position above the lower rail 58. In the preferred embodiment shown in the drawings, each rail is of an open-centered rectangular crosssection and welding is used to attach the steel rails to each other.

Holding apart the sides at the rearward end 64 of the frame, a removable spreader bar 66 is used, such bar being positioned sufficiently near the upper rail 56 to clear the upper portion 68 of each vehicle that is being loaded into the frame. At the forward end 70 of the frame, in order that the sides 55a–b be selectively movable between an expanded position 72 (FIG. 11) in which the sides are spaced remotely apart, and a collapsed position 74 (FIG. 14) in which the sides are closely adjacent to each other, a foldable gate assembly 76 is used. This gate assembly is more fully described in Gearin et al., U.S. Pat. No. 4,768,916, which is herein incorporated by reference. In particular, this gate assembly 76 is comprised of two panel members 78 each attached by a hinge 80 to a respective rearward corner of the frame for inwardly turning movement along a respective side 55a or 55b of the frame, the panels being held together during such inward movement by a central hinge 82. Comparing FIGS. 11 and 14, if the spreader bar 66 is removed and the gate assembly 76 is inwardly folded against the sides of the exemplary frame 30, the frame can be shipped together with a number of other similarly-collapsed frames (e.g., 30, 30' and 30") inside a single container 52, thereby conserving on available cargo space during the return shipment of unloaded frames.

Figure 11:
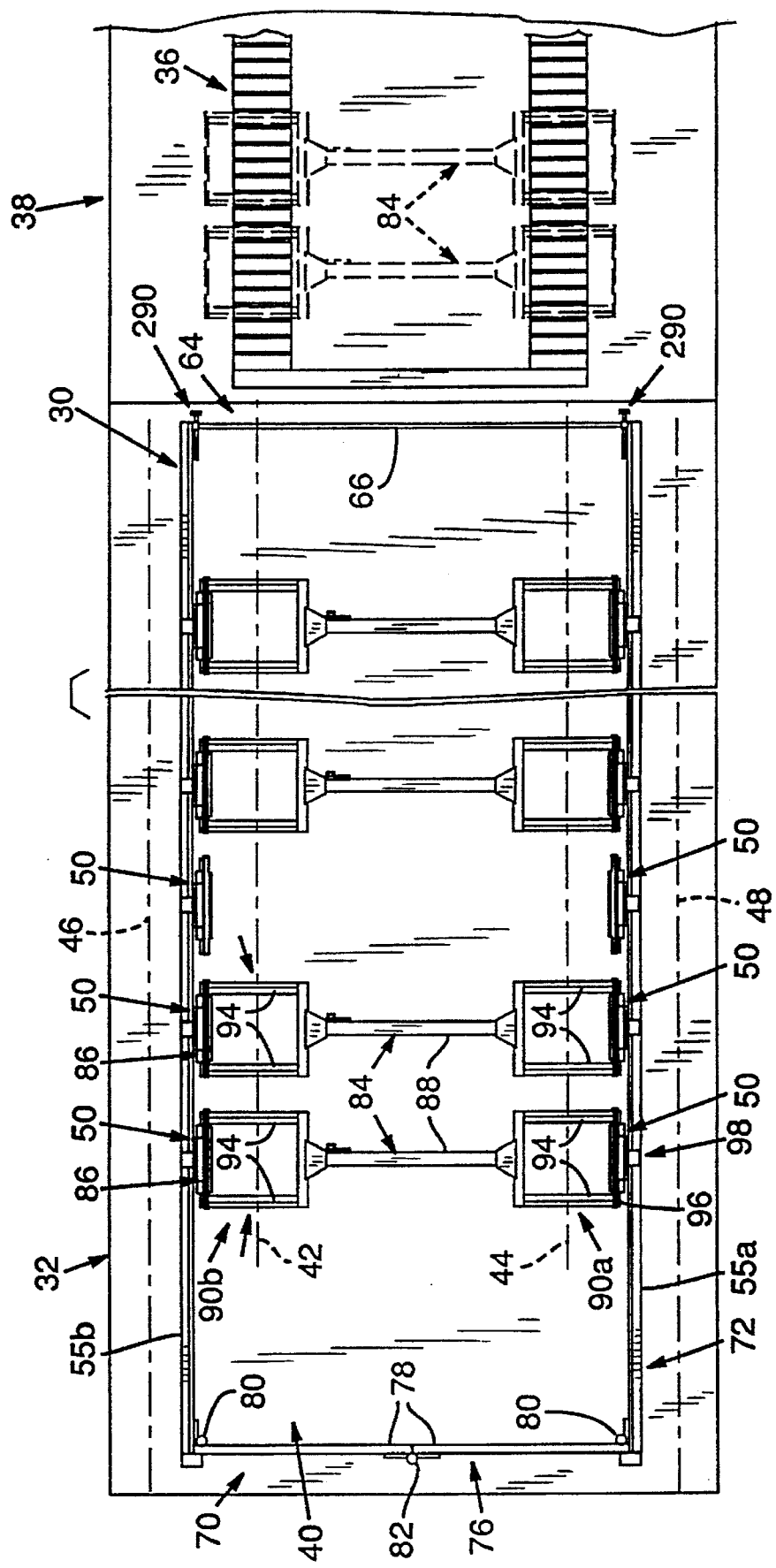
FIG. 11 is a plan view of the exemplary frame and conventional sled assembly of FIG. 2 except that a somewhat different arrangement of wheel cradles and tension members is shown.

Referring to FIG. 11, the exemplary frame 30 includes elongate wheel supports or cradles 84 of a type somewhat similar to those which have been described in Gearin, U.S. Pat. No. 4,957,407. Each of these cradles 84 can be secured to the frame 30 in a vehicle supporting position 86 extending between and generally perpendicular to the upright sides 55a–b of the frame for the support of a respective pair of wheels (i.e., front or back) of a respective vehicle. In addition to an elongate central portion 88, each wheel cradle has opposite first and second end portions 90a–b where each end portion includes a spaced-apart pair of chock members 94 which are joined together by an endpiece 96 and which accommodate the normal variation which exists in side-to-side wheel spacing between different models of vehicles.

Figure 9:
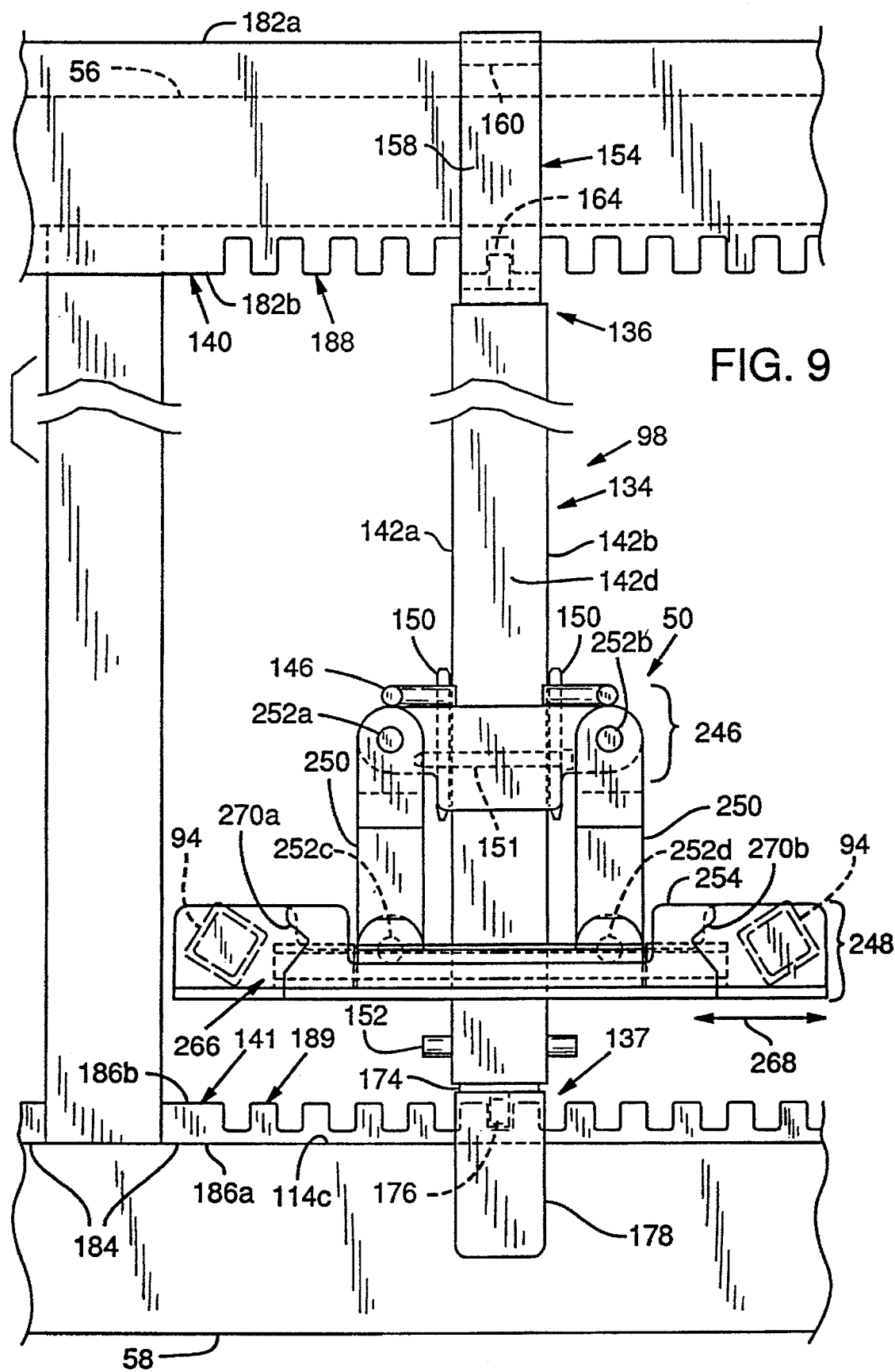
FIG. 9 is an elevational view, partially broken away, looking toward an exemplary tension member and hanger from inside the exemplary frame of FIG. 2.

Referring to FIGS. 2, 9, and 11 together, the respective first and second end portions 90a and 90b of each wheel cradle 84 are supported from corresponding ones of the upright sides 55a and 55b of the exemplary frame by a respective support hanger 50. These hangers 50 are of a type substantially similar to those which have been described in Gearin, U.S. Pat. No. 4,957,407. In accordance with the degree of elevation or tilt desired to be given to each vehicle, each hanger 50 is selectively slidable, either alone or with other hangers, along a vertical tension member 98. Each vertical tension member 98, in turn, is suspended above one or the other of the upper rails 56 and is selectively movable longitudinally along that upper rail so that the spacing between corresponding pairs of tension members can be set in accordance with the wheel base of the vehicles which are to be loaded onto the frame.

In addition to its standard aspects, the exemplary frame 30 incorporates a number of unique and innovative features. These relate, primarily, to those respective mechanisms on the frame which are responsible for wheeled movement of the frame, for installing tension members 98 on the frame, for storing wheel cradles 84 on the frame after the frame has been unloaded, and for limiting movement of the frame within the container 52 when the frame 30 is either opened or collapsed. Each of these mechanisms will now be described, in detail, under a separate subheading.

Mechanisms For Frame-Supporting Wheeled Movement

Referring to FIG. 2, there are two different types of mechanisms provided on the exemplary frame 30 for wheeled movement. The first type 100, which is associated with each outer frame-supporting wheel 102, is essentially of conventional design and includes a squat, rectangular wheel box 103. The second type, 104, which is associated with each inner frame-supporting wheel 106, is of an innovative streamlined configuration. For the sake of comparison, the former type 100 will first be briefly described.

Figure 4:
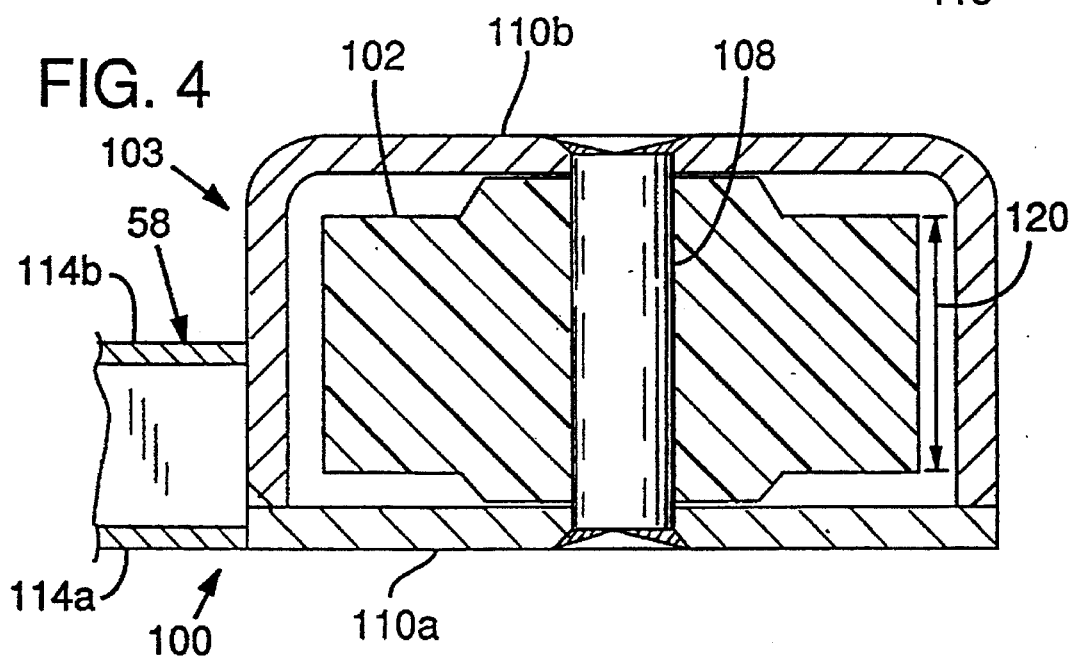
FIG. 4 is a sectional view, taken along lines 4—4 in FIG. 2, showing the outer wheel mounting mechanism of the exemplary frame.

In the first type of mechanism 100 provided for wheeled movement, each wheel box 103 is welded, as a self-contained unit, to a respective end of a lower rail 58 and corner rail 60a–b. Referring to FIG. 4, inside each wheel box 103, an outer wheel 102 of relatively large thickness is protectively mounted for rotation about a shaft 108 joining the transverse sides 110a–b of the wheel box. This wheel is made of relatively large thickness in order, primarily, that the amount of pressure conveyed by that wheel in bearing down upon the floor will be limited. In a floor of softer material, such as plywood, such limiting of pressure can prevent the floor from pitting or cracking. Because of its relative thickness, however, the outer wheel 102, and the corresponding wheel box 103, jut inwardly, in characteristic fashion, from the inner side 114b of the lower rail 58.

Figure 3:
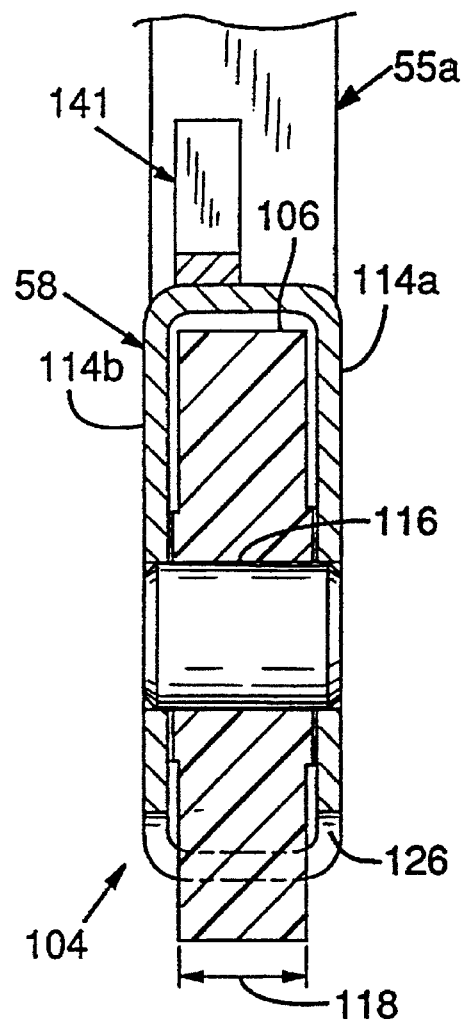
FIG. 3 is a sectional view, taken along lines 3—3 of FIG. 2, showing the inner wheel mounting mechanism of the exemplary frame.

Referring to FIG. 3, in contrast to the above structure, the second type of mechanism 104 which is provided for wheeled movement has a streamlined configuration. This second type of mechanism 104, in accordance with the present invention, integrates portions of each respective lower rail 58. In particular, each inner wheel 106 is supported in interposed position between the transversely-spaced sides 114a–b of a respective lower rail for rotation about a shaft 116 joining these sides. As will be clear from FIGS. 3 and 4 together, in order to fit between these sides 114a–b of the lower rail, the width 118 of each inner wheel 106 must be made relatively narrow in comparison to the larger width 120 of each outer wheel 102.

Figure 5:
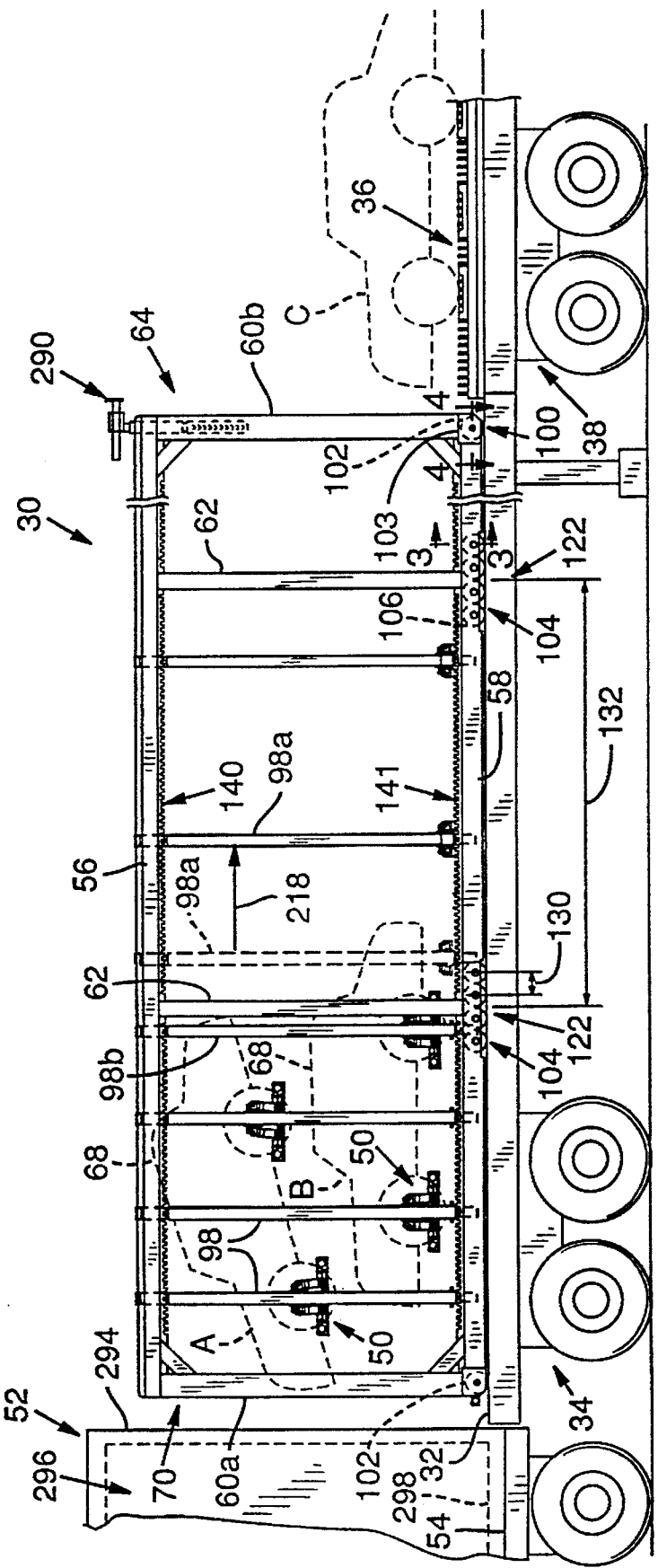
FIG. 5 is an enlarged side elevational view, partially broken away, of the tension member installing mechanism in correspondence with the inner wheel mounting mechanism of the exemplary frame of FIG. 2.

Referring to FIGS. 2 and 5, although the narrowing of each inner wheel 106 could normally be expected to result in increased loading of the floor 121, this effect is counteracted by the use of groups 122 of inner wheels, where the inner wheels within a particular group occupy longitudinally-spaced, serially adjacent wheel locations (e.g., 124a–d). Collectively, the inner wheels of each group 122 provide a larger surface area for conveying the weight of the frame 30 to the floor than is even provided by each outer wheel 102 with its larger width.

An additional benefit arising from the second type of mounting arrangement 104 is that during manufacture of the exemplary frame 30 each lower rail 58 can be joined to the frame as a single piece, as there is no longer a need to divide the lower rail into discrete segments to join together intermediately positioned wheel boxes. Referring to FIG. 5, to further minimize processing, only a single cutout 126 is preferably made in the bottom portion 128 of the lower rail for each group 122 of inner wheels.

Referring again to FIG. 2, for maximum stability, the groups 122 of inner wheels are preferably distributed at those locations along the lower rail 58 where the weight is most highly concentrated, that is, in one-to-one alignment with the vertical compression rails 62. These structural relationships, taken together, account for the characteristic arrangement of the inner wheels shown in FIG. 2, where the longitudinal separation 130 between respective wheel locations (e.g., between 124c and 124d) within each group 122 (FIG. 5) is substantially less than the longitudinal separation 132 between respective ones of the groups.

Because of the streamlined configuration of the mechanism 104 used for mounting the inner wheels 106, and because of the exemplary mechanism used for coupling each tension member 98 to the lower rail 58, the exemplary frame 30 provides a significant increase in the number of vehicle loading patterns supported. This important advantage is further described below under the subheading immediately following.

Mechanism For Installing The Tension Members

Figure 8:
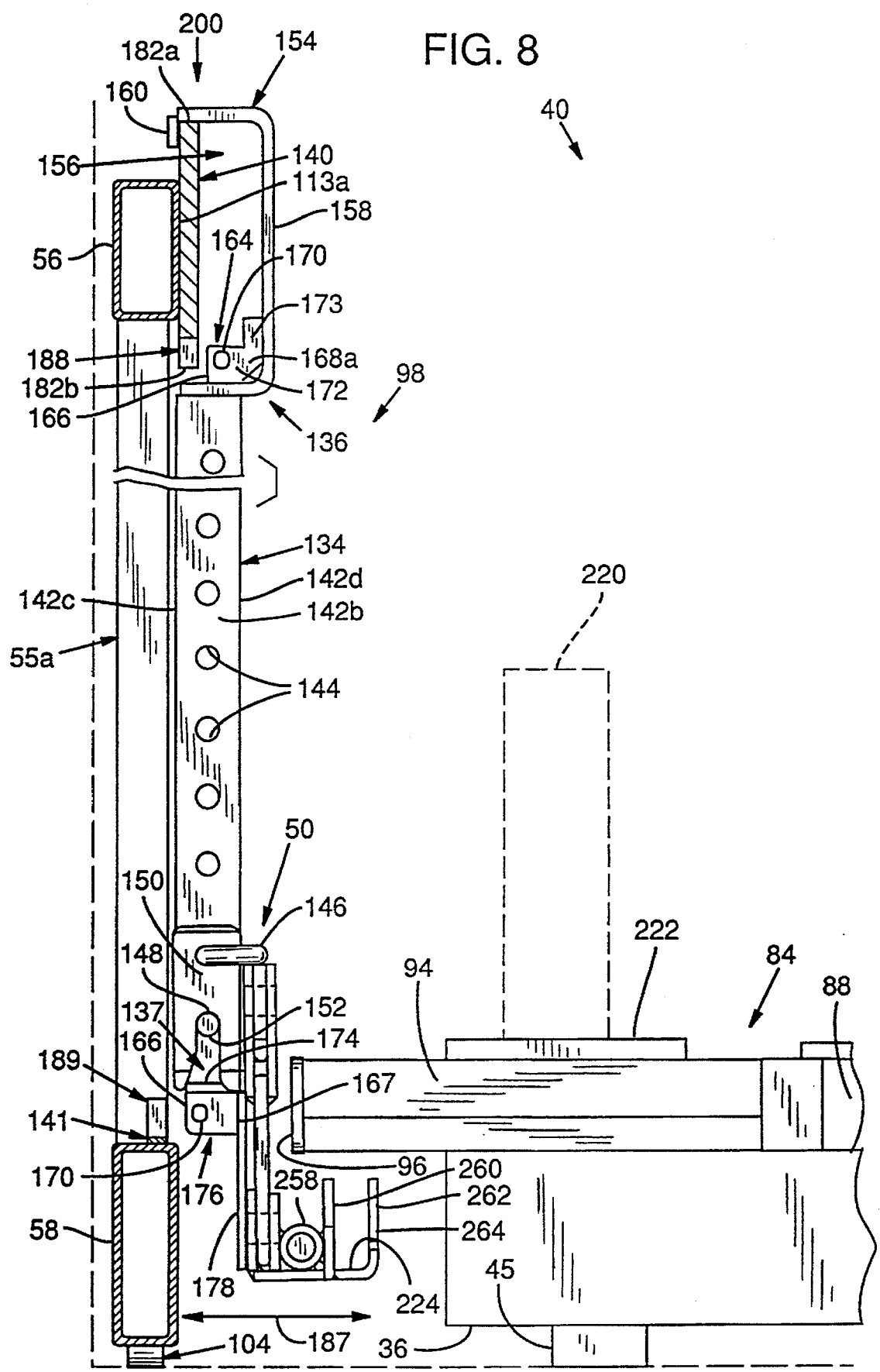
FIG. 8 is similar to FIG. 7 except with the exemplary tension member in a suspended unlocked position.

Referring to FIGS. 8 and 9, each tension member 98 of the exemplary frame includes an elongate central portion 134 and an upper and lower end portion 136 and 137. Referring also to FIG. 5, the mechanism 138 for installing a particular tension member 98b incorporates structure included on the respective end portions 136 and 137 of the tension member as well as corresponding structure separately included on an elongate upper and lower plate 140 and 141 which are permanently joined to the upper and lower rails 56 and 58, respectively. In the following description, the detailed structure of each tension member 98 and the upper and lower plates 140 and 141 will each be discussed separately and then their operation together will be described.

Referring again to FIGS. 8 and 9, the elongate central portion 134 of each tension member 98 is primarily of conventional construction. In particular, the central portion 134 is formed of rectangular metal tubing and has laterally-spaced sides 142a–b along each of which are formed a lengthwise series of holes 144. These holes, in side-by-side registration, define the various vertical positions in which the tension member 98 will support the hanger 50. As described in greater detail in U.S. Pat. No. 4,957,407, the loop or eye portions 146 (refer to FIG. 10) of the hanger 50 can be engaged by the hooks of a gantry (not shown) and the hanger lifted until the cleft 148 formed in its side panels 150 (FIG. 8) lie just above a selected pair of holes. Thereupon a pin 151 (FIG. 9) can be inserted between the selected holes, and the hanger can be lowered to cause each side panel 150 to catch the protruding ends of the pin. A permanent pin 152 having protruding ends is included at the lower end of the central portion to provide a rest position for the hanger while the sled 36 is being operated to move vehicles into the frame. This permanent pin, as with all other parts of the tension member, is preferably of steel or other metal.

The upper end portion 136 of each tension member includes a generally U-shaped hook portion 154 preferably bent from a single flat plate and welded to the upper end of the central portion 134. The hook portion 154 includes an open channel 156 facing toward the front side 142c of the central portion and a cross-piece 158 extending in offset relation from the back side 142d of the central portion. A finger 160 of flat plate is welded to the hook portion 154, the finger 160 forming an upper front corner with the hook portion 154. An L-shaped upper lug 164 having a generally rectangular central body 172 and a leg 173 extending perpendicularly from the central body is joined to the lower inside corner of the hook portion 154, so that its leg 173 lies adjacent the crosspiece 158 of the U-shaped hook portion and its rectangular forward edge 166 lies in offset relation from the front side 142a of the central portion 134. Adjacent this forward edge, an opening 170 is drilled between the transverse edges 168a–b of the upper lug.

The lower end portion 137 of each tension member includes a cap 174 formed by a flat plate, which closes off the open center of the central portion 134, and a lower lug 176 of generally like shape and dimension as the rectangular central body 172 of the upper lug 164 but mounted so that its rectangular forward edge 166 lies flush with the front side 142c of the central portion 134. An elongate plate-like tailpiece 178 is attached to the back edge 167 of the lower lug 176 in downward extension therefrom.

Referring to FIGS. 8 and 9, as heretofore noted, in order to facilitate coupling between the upper and lower end portion 136 and 137 of each tension member 98 and the corresponding upper and lower rail 56 and 58, the exemplary frame includes an elongate upper and lower plate 140 and 141, respectively. The upper plate 140 is the relatively wider of the two and is welded in lapped position against the inner side 113a of the upper rail 140 with both its upper and lower edges 182a and 182b extending vertically beyond the upper rail 56. Referring to FIG. 9, the lower plate 141 is divided into elongate segments 184 each of suitable length to fit between a corresponding pair of vertical compression rails 62 (FIG. 2). Each segment is welded to the lower rail 58 with its lower edge 186a butting against the upper side 114c of the lower rail and its upper edge 186b vertically extending toward the opposite upper rail 140. This mounting arrangement maximizes the amount of clearance that is available in a side-to-side direction 187 (FIG. 8) between the respective lower rails 58 of the frame.

Desirably formed along the lower edge 182b of the upper plate 140 and the upper edge 186b of the lower plate 141 are an upper and lower series of uniformly-spaced teeth 188 and 189, respectively. As shown in FIG. 5, each tooth (e.g., 190a) of the upper series is in substantial vertical alignment with a corresponding tooth (e.g., 192a) of the lower series. The respective teeth of each series 188 and 189 are substantially rectangular in shape and are preferably formed using a burning torch, so that a hardened layer is developed along the edge of each tooth. Printed indicia (e.g., 194a–b) in the form of duplicate sets of numbers or other symbols, identify respective pairs of corresponding coupling locations (e.g., coupling location "45" on the upper plate and corresponding coupling location "45" on the lower plate), as defined between respective pairs of teeth (e.g., 190a–b) on the upper series 188 and vertically corresponding respective pairs of teeth (e.g., 192a–b) on the lower series 189.

Referring to FIG. 8, when tension members of the foregoing preferred type are to be installed on the exemplary frame, preferably the finger 160 on the upper end portion 136 of the particular tension member 98 is hooked into adjoining position over the protruding upper edge 182a of the upper plate 140 resulting in support of the tension member in a first suspended position 200 as shown. In this first suspended position, the upper and lower lugs 164 and 176 of the tension member are spaced apart from the respective series of teeth 188 and 189 of the upper and lower plates 140 and 141, making it possible, by sliding movement of the hook portion 154 along the continuous upper plate 140, to freely move the upper and lower end portions 136 and 137 of the tension member longitudinally of the upper and lower plates 140 and 141.

Figure 7:
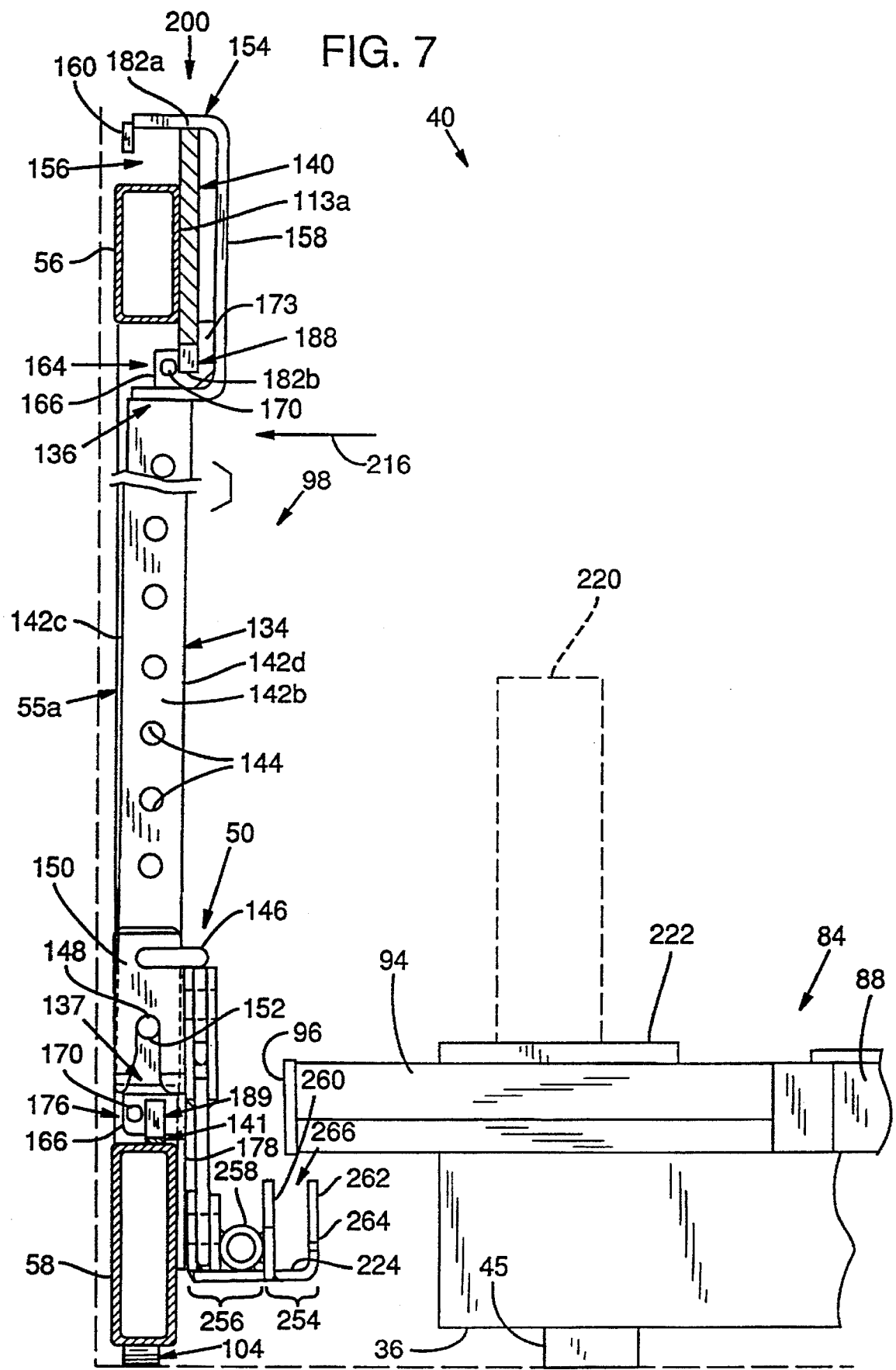
FIG. 7 is a side elevational view, partially broken away, of an exemplary tension member in a suspended locked position on the exemplary frame of FIG. 2 and a schematic view of a conventional sled, wheel cradle and vehicle tire which have been moved into adjoining position with the tension member.

Referring to FIG. 5, the particular tension member being installed is then shifted longitudinally, as needed, until its upper and lower lugs 164 and 176 are in direct alignment with a desired pair of corresponding coupling locations (e.g., "50") which are easily identified by their like printed symbol on the upper and lower plates 140 and 141. Thereupon, the tension member is drawn laterally away from the open central area 40 of the frame into a second suspended position 202 as shown in FIG. 7. Viewing FIGS. 5 and 7 together, in the second suspended position, the upper lug 164 is received between a respective pair of the upper series of teeth 188 of the upper plate 140 and the lower lug 176 is received between a corresponding pair of the lower series of teeth 189 of the lower plate 141. Accordingly, in the second suspended position 202, the upper and lower end portions 136 and 137 of the tension member are locked against longitudinal movement along the upper and lower plates 140 and 141, respectively. By selection of corresponding coupling locations (e.g., "50"), the tension member is assured of support, without longitudinal tilt, in substantial alignment with the vertical reference direction 204 (FIG. 5).

Figure 6:
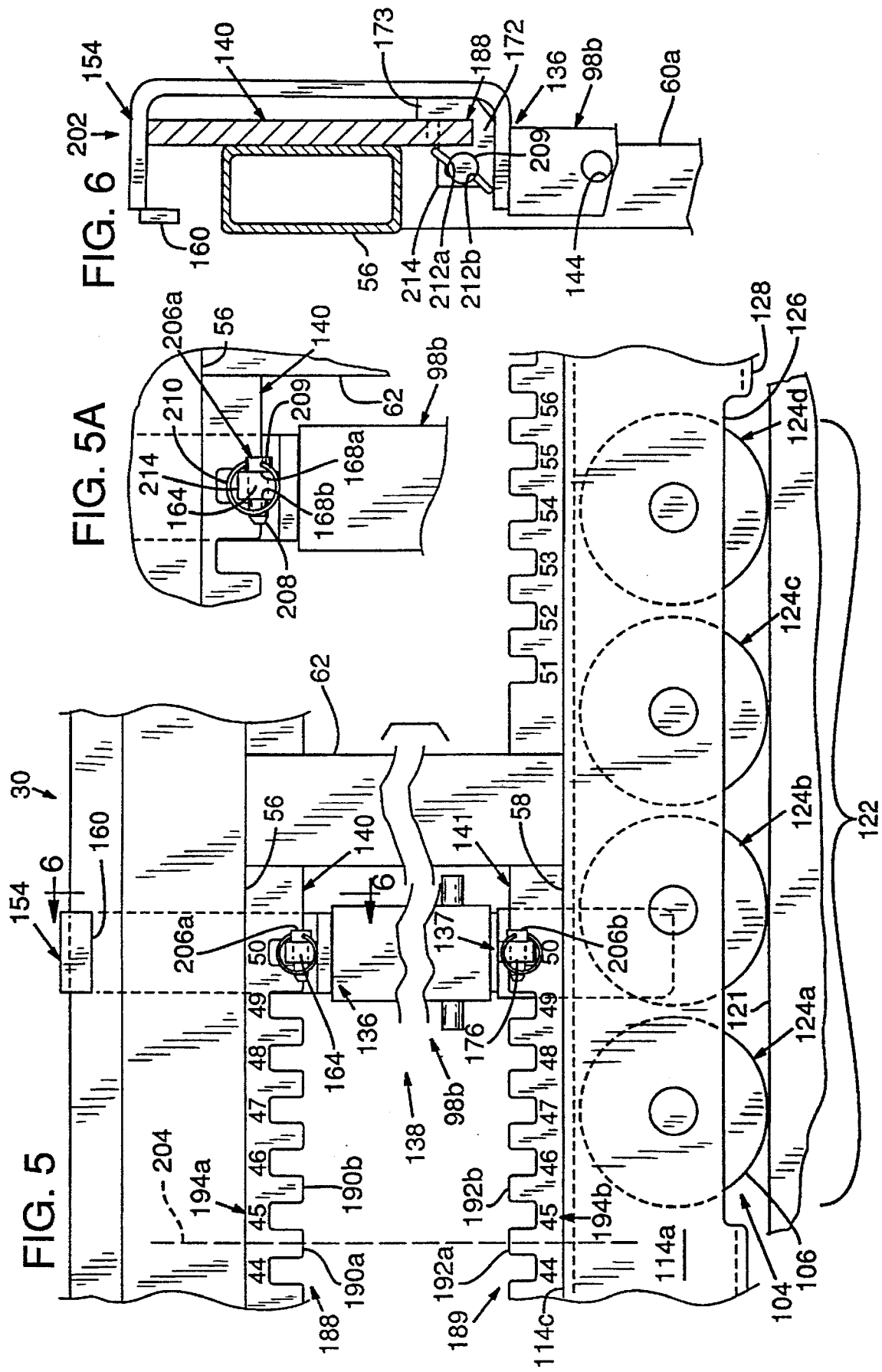
FIG. 6 is a sectional view, somewhat enlarged, taken along lines 6—6 in FIG. 5.

Referring to FIGS. 5 and 5a, to lock the tension member 98b into the second suspended position, a pair of self-locking pins 206a–b are utilized. Each self-locking pin includes an elongate cylindrical body 208 having a head 209 which carries a ring 210. Referring also to FIG. 6, the respective ends 212a and 212b of this ring are pivotably connected to the head 209 in an offset configuration that tends to bias the ring to a position adjoining one side or another of the body 208. Accordingly, after each pin 206a or 206b has been passed through the opening 170 of a respective lug 164 or 176 (FIG. 7), and after each ring has been swiveled, as shown, into locked position over the free forward corner 214 (FIG. 5A) of a respective lug, the natural bias of the ring tends to maintain the ring in this locked position, thereby preventing the pin 206a–b from backing out of the opening.

Referring to FIGS. 6 and 7 together, by controlling the spacing between the opening 170 for the pin and the leg 173 at the upper end portion 136 of the tension member 98b and between the opening 170 for the pin and the tailpiece 178 at the lower end portion 137, the degree of "clatter" that may occur between the tension member 98b and the upper and lower plates 140 and 141 can be minimized. Furthermore, referring to FIGS. 5 and 5a, because each of the upper and lower lugs 164 and 176 has transverse edges 168a–b which are relatively thick across, the opening 170 which is formed between these edges is not likely to wear down and become enlarged even when transversely-outward forces 216 (FIG. 7) bear heavily upon the tension member during transport of the frame, so that any clatter which may occur at the outset will not increase with time.

At any time after being installed, a particular tension member can be repositioned on the exemplary frame quickly and easily. Referring to FIG. 2, for example, in order to move the particular tension member 98a from its previously selected coupling position indicated in dashed lines to a newly selected coupling position indicated in solid lines (e.g., to receive vehicle C) it is only necessary that the respective self-locking pins 206a–b(FIG. 5) be swiveled opened and removed, that the tension member first be drawn inwardly of the frame to its first suspended position 200 (FIG. 8), then shifted in a longitudinal direction 218 (FIG. 2), and then drawn outwardly back to its second suspended position 202 (FIG. 7), and that the respective self-locking pins 206a–b be reinserted and swiveled closed. In particular, the pace of this repositioning operation is not delayed by the use of pinning systems that require piece-by-piece assembly and disassembly, nor is use made of any thin-walled member which could easily break under repeated stressing.

The above-described positioning sequence can be followed regardless of whether a vehicle has been moved by the sled into a position directly across from the tension member. Referring to FIGS. 7 and 8, a sled 36 is shown positioned upon its track 45 directly across from an upright side 55a of the frame. Also shown are a respective tire 220 of a vehicle that is being supported on the upright slats 222 (one visible) of the sled and a wheel cradle 84 that is being carried below the tire between the upright slats 222 of the sled (e.g., as in the dashed-line position shown in FIG. 11). As illustrated in FIGS. 7 and 8, provided that the hanger 50 is supported in its rest position on the permanent pin 152 of the tension member 98, the tension member can be moved freely between its first supported position 200 (FIG. 8) and its second supported position 202 (FIG. 7) without interference either from the adjoining sled 36, the adjoining tire 220 of the vehicle, or the adjoining wheel cradle 84. As further illustrated by FIG. 7, when the tension member is in its second supported position 202 ready to be pinned, the load-bearing shelf 224 of the hanger 50 is automatically positioned beneath the endpiece 96 of the wheel cradle 84, so that when the hanger 50 is lifted away from the lower rail 58, the load-bearing shelf 224 will automatically engage and lift the endpiece 96 of the wheel cradle (refer also to FIG. 10).

Referring to FIG. 8, when the tension member is in its first suspended position 200, the lower lug 176 is positioned closer to the lower rail 58 than is the upper lug 164 to the upper rail 56, thereby providing maximum clearance for the sled 36 to enable vehicles of maximum width to be loaded on the frame.

In FIGS. 2 and 5, the particular tension member denoted by reference numeral 98b occupies a coupling location (i.e., "50") of the lower rail 58 that generally corresponds with a wheel location 124b of the lower rail. Such correspondence is made possible, in part, by the streamlined configuration of the structure 104 used to mount the inner wheels 106, as described more fully herein under the subheading immediately preceding. In part, such correspondence is possible because the pinning which is needed to complete installation of the tension member can be done entirely above the upper side 114c of the lower rail 58, rather than needing to be done through the upper side into the region where the inner wheels 106 are located.

For the particular loading pattern depicted in FIG. 2, the ability to select a coupling location (i.e., "50") for the tension member 98b that is in correspondence with a wheel location 124b(FIG. 5) enables the lower vehicle B supported on the tension member to be positioned more directly below the upper vehicle A. Without this ability, the particular tension member 98b and the lower vehicle B would need to be shifted to the right about as far as the longitudinal shift 218 depicted for tension member 98a. This, in turn, would likely decrease the number of additional vehicles that could be loaded on the frame. Accordingly, referring to FIG. 5, the tension member installing mechanism 138 and the inner wheel mounting mechanism 104 of the exemplary frame cooperate together to provide an increase in vehicle loading patterns of sufficient extent to enable a greater number of vehicles to be supported on the frame.

Mechanism For Storing The Wheel Cradles

Figure 12:
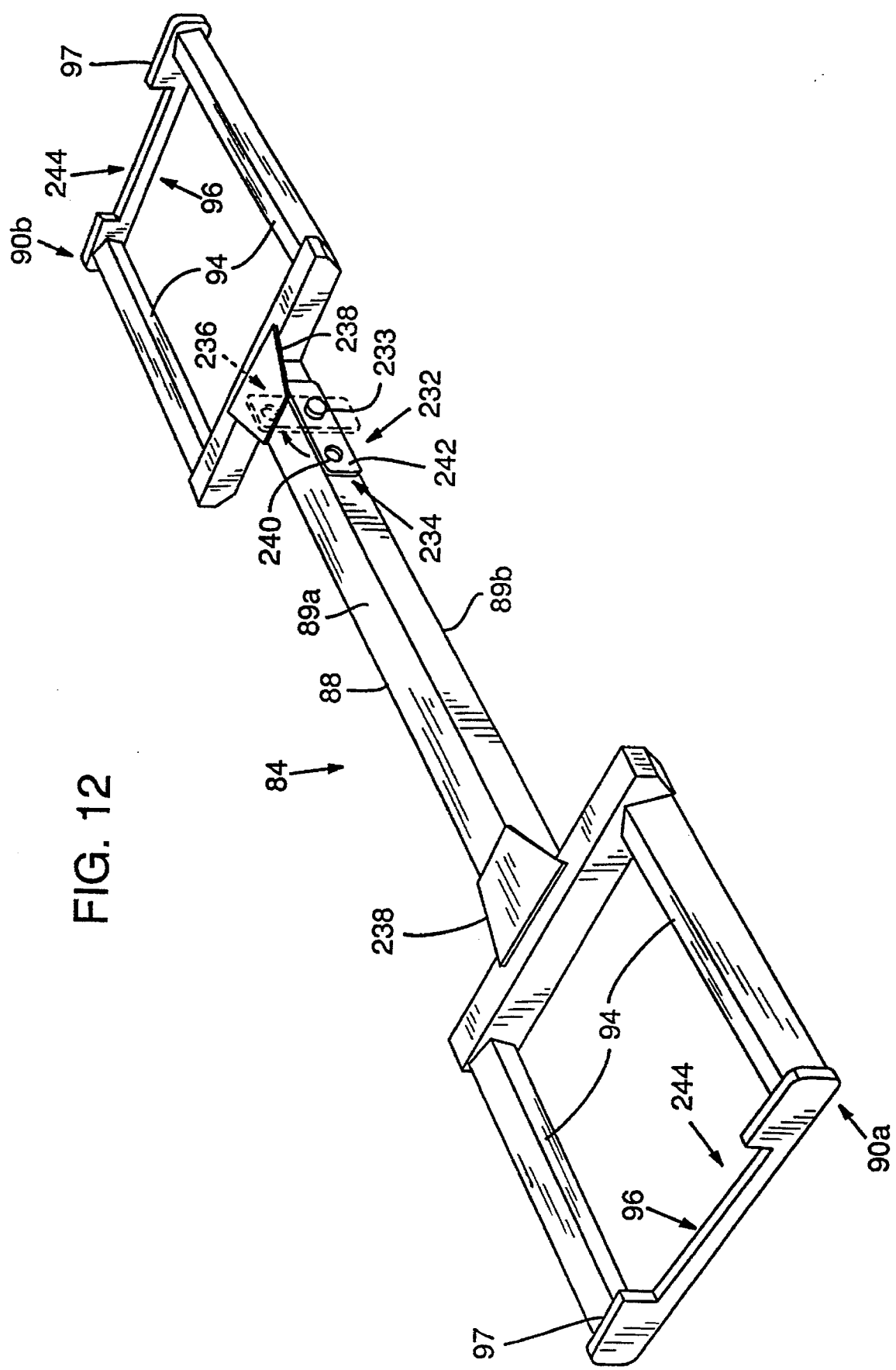
FIG. 12 is a perspective view of an exemplary wheel cradle in accordance with the present invention.
Figure 13:
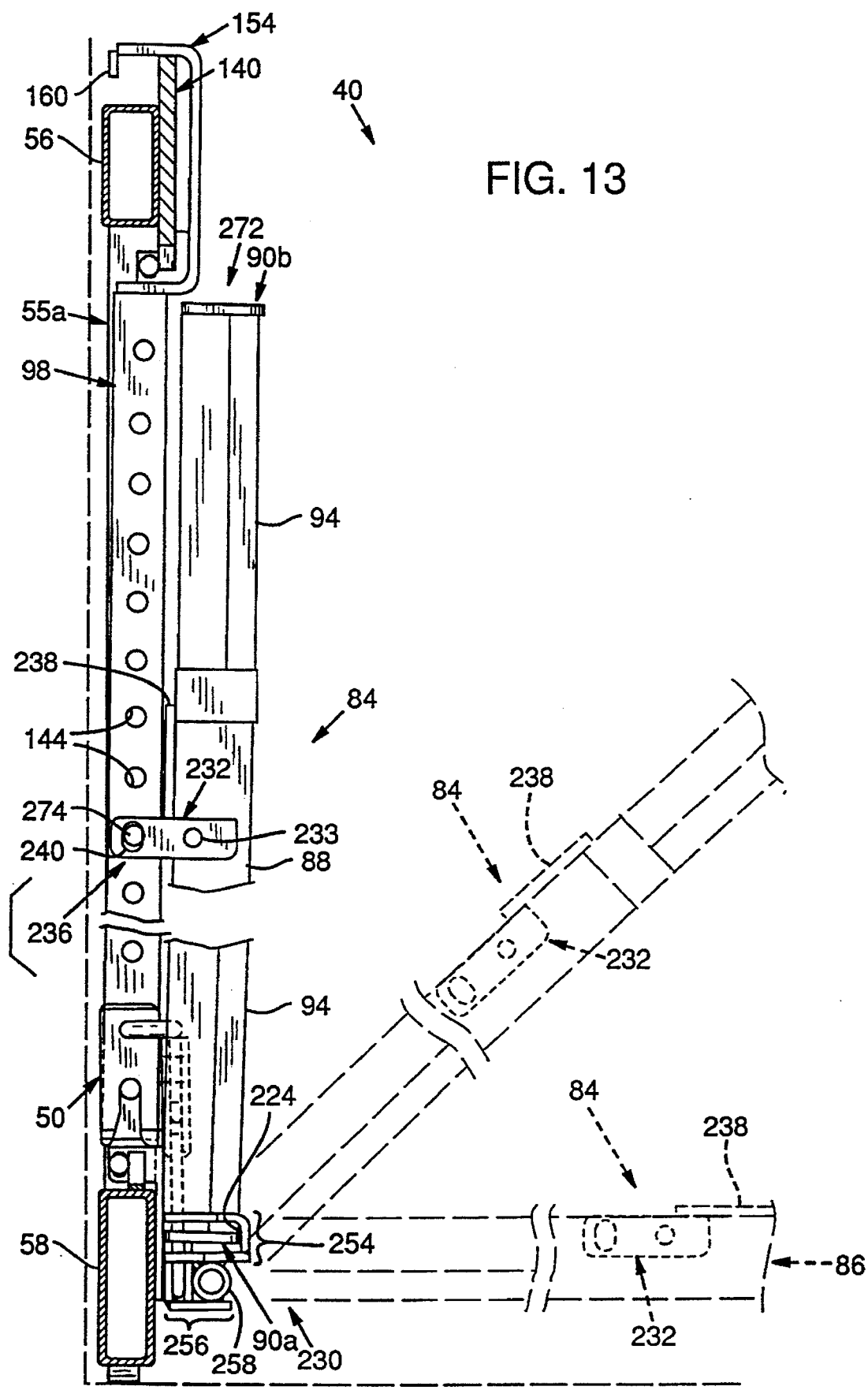
FIG. 13 is a side elevational view, partially broken away, showing the operation of the wheel cradle storage mechanism of the exemplary frame of FIG. 2.

Referring to FIGS. 12 and 13 together, the mechanism 230 for storing each wheel cradle 84 on the exemplary frame incorporates not only structure specifically created for that purpose on each wheel cradle but also structure on each hanger 50 which, although known, has heretofore been used only for a different purpose. In the following description, the pertinent respective structure on the wheel cradle 84 and hanger 50 are first identified and then the preferred use of these interacting structures is described.

Referring to FIG. 12, each wheel cradle 84 of the exemplary frame includes an elongate blade 232 which, at one end, is pivotably connected by a stud 233 in offcentered relation to the elongate central portion 88 of the wheel cradle. This allows the blade 232 to pivot from a rest position 234, depicted in solid lines, to a ready position 236, indicated in dashed lines. In its rest position 234, the blade lies generally flush with the upper side 89a of the central portion 88 and is prevented from pivoting beneath the lower side 89b due to interference by a cheek plate 238 which is conventionally mounted on the upper side. In its ready position 236, the blade 232 extends outwardly from the upper side 89a. Opposite its pivoting end, the second end of the blade defines an opening 240 which extends between the broad sides 242 of the blade.

With regard to the first and second end portions 90a–b of the wheel cradle, an elongate substantially rectangular cutout 244 is formed along the upper edge 97 of each respective endpiece 96. The minimum length and depth of these cutouts are determined by the geometry of the hanger 50 as will shortly be described.

Referring to FIG. 9, the hanger 50 of the exemplary frame is substantially similar to the type described in U.S. Pat. No. 4,957,407. In particular, the hanger includes an upper portion 246 connected to a base portion 248 by a spaced-apart pair of slats 250. Four pivot joints 252a–d enable the base portion 248 to shift from side-to-side, without tilt, relative to the upper portion 246. Referring also to FIGS. 7 and 13, the base portion 248 is divided into a forward end 254 and rearward end 256, where the forward end is pivotable about a hinge 258 back over the rearward end. This pivoting assembly, as was more fully described in Bates et al., U.S. Pat. No. 4,919,582, enables the forward end 254 to move clear of the open central area 40 of the frame when vehicles are being loaded into the frame on a platform rising up through the bottom of the frame. The pivoting assembly also, in accordance with the present invention, forms a basis of the mechanism 230 for storing the wheel cradles, as will be described more fully below.

Referring to FIG. 7, the forward end 254 of the base portion 248 includes a back plate 260 and a front plate 262.

Figure 10:
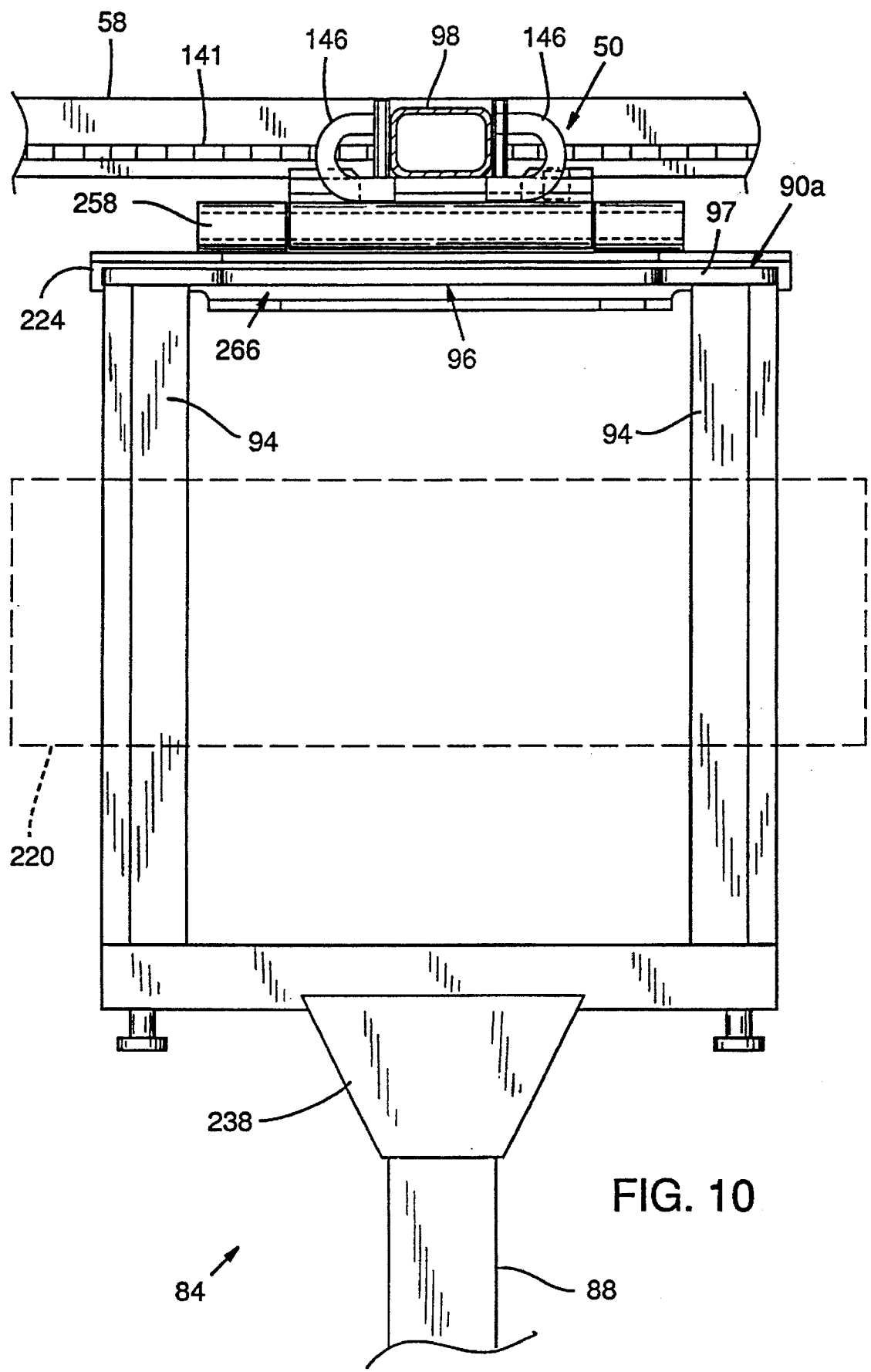
FIG. 10 is a plan view showing an exemplary wheel cradle, in fragment, being supported by a hanger on the exemplary frame of FIG. 2.

The front plate 262 has a generally L-shaped cross section, with one leg defining a load-bearing shelf 224 and the other leg defining an upright edge 264. Together the back plate 260 and front plate 262 form a channel 266 which, as best shown in FIG. 10, is sufficiently wide to receive the endpiece 96 of a respective wheel cradle, so that the end portion of the wheel cradle can be supported on the load-bearing shelf 224.

Referring to FIG. 9, in some instances, movement of the wheel cradle may occur in a side-to-side direction 268 within the channel 266 either when a vehicle is being tilted, such as to the position shown for vehicle A in FIG. 2, or when the frame is subject to jolting during transport. In accordance with the present invention, the forward end 254 of the hanger includes a laterally spaced-apart pair of notches 270a–b which are shaped to receive a corner portion of each chock member 94 and which serve to prevent the chock members 94 from "jumping" the forward edge during particularly forceful side-to-side movements. At least in connection with this particular feature, then, the hanger 50 of the exemplary frame is different from the type described in U.S. Pat. No. 4,957,407.

Referring to FIGS. 9 and 12 together, regardless of where the chock members 94 are located relative to the notches 270a–b of the hanger, the length of the cutout 244 in each wheel cradle is preferably sufficient for the cutout to extend in front of, and not off to one side, of each slat 250. Referring now to FIG. 13, provided also that the cutout 244 is of sufficient depth, this enables the wheel cradle 84 to be pivoted about the hinge 258 of the hanger 50 from the vehicle supporting position 86 indicated in dashed lines upwardly to the storage position 272 indicated in solid lines. In the storage position 272, the wheel cradle extends adjacent and generally parallel to a respective one of the upright sides 55a of the frame. To secure the wheel cradle, at last, in the storage position 272, the blade 232 of the wheel cradle is pivoted to its ready position 236, as shown, and a pin 274 is inserted through the opening 240 in the blade and the corresponding hole 144 of the tension member 98, whereupon the pin 274 can be clipped at its end, in a manner similar to that shown in FIG. 15, to hold the pin in place.

As will be recognized from the above description, the storage procedure for a single wheel cradle 84 is composed of only a few steps, each relatively simple to execute, so that even a relatively inexperienced loading team can implement the procedure. Furthermore, it is most unlikely that the wheel cradle, when secured in the storage position 272, will be able to come loose and to fall on or otherwise damage any vehicles in adjacent position on the frame.

During the upward pivoting movement of the wheel cradle, because the load-bearing shelf 224 at all times maintains its support of the first end portion 90a, the operator needs to lift only half the total weight of each wheel cradle 84. For a typical wheel cradle made of steel and weighing about 80 pounds, this represents a substantial enough decrease in weight to lessen the incidence of back sprain, and such other injuries as may result from the dropping of a wheel cradle.

Figure 14:
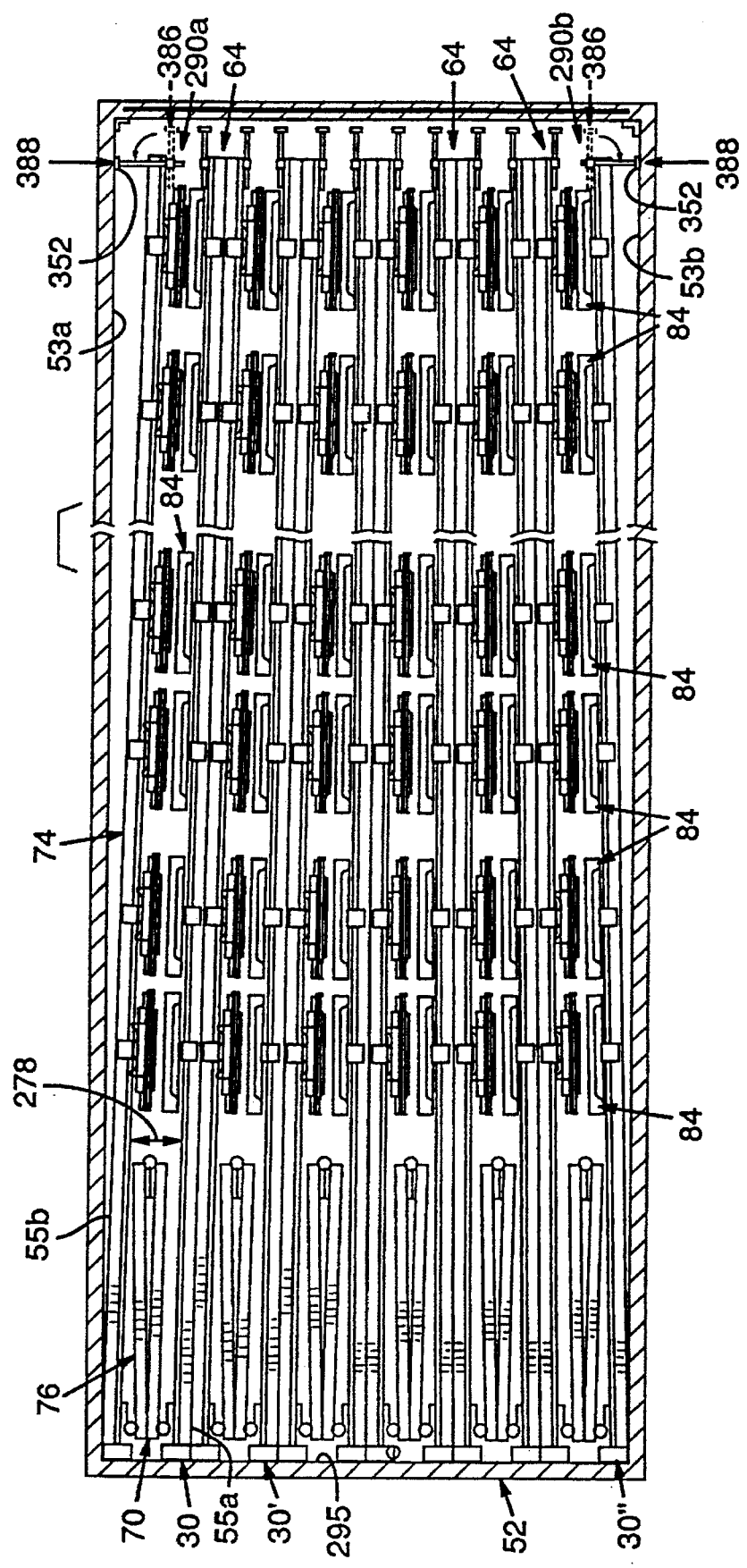
FIG. 14 is a plan view, partially broken away, looking through the ceiling of a standard container to reveal a number of exemplary frames inside, where each frame is in collapsed position, each supports a number of wheel cradles in a preferred storage position, and each is transversely clamped in place by a pair of exemplary rack stops.

A further advantage of the described storage mechanism 230 is its compatibility with the collapsing mechanism of the exemplary frame. FIG. 14 shows a number of these frames (i.e., 30, 30', and 30") where the respective upright sides 55–b of each frame have been moved to their closely adjacent collapsed positions, thereby enabling each one of the frames to be loaded into a single container 52 for efficient transport. Even when collapsed, there is sufficient clearance 278 between the upright sides 55a–b of each frame to permit the wheel cradles, in their storage position, to fit easily in interposed position between such sides.

Mechanism For Limiting Movement Of The Frame

Referring to FIGS. 11 and 15, the exemplary frame includes a transversely-spaced pair of adjustable rack stops 290 for limiting movement of the frame when the frame is inside the container. For example, referring also to FIG. 2, after the entryway 292 which is defined in the rear endwall 294 of the container 52 has been opened, the fully loaded frame can be wheeled into the interior 296 and across the floor 298 of the container until the forward end 70 of the frame abuts the forward endwall 295 (FIG. 14) of the container.

With the frame in this far forward position, because of the variation which exists in the lengths of different containers and because of the need to size the frame for the minimum container length, the rearward end 64 of the frame, as indicated in FIG. 15, generally will be spaced apart from the rear endwall 294 of the container by a certain longitudinal distance 300. If, during transport, the frame were able to move inside the container over the full extent of this longitudinal distance 300, the frame could acquire sufficient momentum to damage either the container 52 or the vehicles loaded on the frame. As indicated in FIG. 15, each rack stop 290 is configured to interact, after a series of adjustments, with the upper margin or sill 302 which normally borders the entryway, so that the final amount of distance available for longitudinal movement of the frame (e.g., 304) is limited to an acceptable amount. As indicated in FIG. 14, the rack stops 290a–b of an outside pair of frames 30 and 30" will also cooperate to hold together, in a transversely stable position, a number of collapsed frames that have been loaded into a single container 52.

FIGS. 15 and 16 show an exemplary rack stop 290, in accordance with the present invention, having a mounted portion 306 and a movable portion 308. As shown, the mounted portion is situated on the inner side 310 of a respective corner rail 60b, at the rearward end 64 of the frame, alongside a respective upper rail 56. The upper plate 140 corresponding to the upper rail 56 extends, as depicted, between the upper rail 56 and the rack stop 290.

Referring also to FIG. 17, the mounted portion 306 of the rack stop includes an elongate tubular guide 312 of annular cross section which is mounted adjacent the inner side 183a of the upper plate 140 by an upper flange 314 and a divided pair of lower flanges 316a–b. Each of these flanges has a curved edge (e.g., 318) adapted to receive the tubular guide along a portion of the guide's outer circumference. These and other individual pieces of the rack stop are preferably made of steel or other metal and are joined together by welding. The tubular guide includes an inner guide channel 320 and is mounted so that the inner guide channel extends in a vertical direction parallel with the edges 322 of the corner rail 60b as shown in FIG. 15.

Referring to FIG. 16 and 18, the mounted portion 306 further includes an elongate adjustment member 324 which is made from a plate that has been formed to have a generally U-shaped cross section. In particular, the adjustment member includes a pair of transversely-spaced sides 326a–b and an open channel 328, where the separation between the transversely-spaced sides is made to correspond, in length, to the diameter of the inner guide channel 320 of the tubular guide 312 (FIG. 17). Referring to FIG. 15 and 16, a series of vertically-spaced holes 330 are defined along each of these sides where the holes on one side correspond in position to those on the other to permit selective insertion of a pin 332, shown in dashed lines in FIG. 15, into a respective one of several different pinning positions (i.e., 334a–e). The pin is locked into a respective pinning position by virtue of its enlarged head 336 and by a lynch pin 338 which is passed through a hole defined in the end of the pin 332 opposite the head 336. Referring to FIG. 16 and 17 together, the elongate adjustment member 324 is mounted to the corner rail 60b in a vertically extending position directly aligned, in spaced apart end-to-end relationship, with the tubular guide 312.

As shown in solid lines in FIGS. 16 and 17, the movable portion 308 of the rack stop 290 includes a slide 340 that is formed by an elongate hollow-centered rod of annular cross section with an outer circumference that closely corresponds to the inner circumference of the tubular guide 312 as measured across the guide channel 320. As shown with alternately dashed and dotted lines in FIGS. 15 and 16, the slide is movable along the tubular guide 312 between a number of different vertical slide positions (e.g., 342a–c). Referring to FIG. 18, formed at the lower end 344 of the slide 340 are a pair of holes 346a–b that cross at right angles to each other. Referring to FIGS. 15 and 18 together, the slide is maintained in a selected one of the vertical slide positions 342a–c when the pin 332 is inserted through a desired one of the pair of holes 374a–b in a corresponding one of its pinning positions 334a–e. Capping the upper end of the slide 340 is a circular upper plate 348 which prevents the slide 340 from dropping completely through the tubular guide 312 at times when the pin 332 is not in one of its pinning positions 334a–e.

Referring to FIG. 15 and 16, the movable portion of the rack stop includes an elongate threaded shaft 350 at the end of which is mounted a head 352. In particular, the head 352 includes a rectangular end plate 354 which, as best seen in FIG. 17, is rear mounted to the end of the shaft 350 in eccentric position with the shaft. A plurality of corner plates 356, which are welded between the end plate 354 and the end of the shaft 350 reinforce the connection between end plate and shaft. Preferably, the front face 358 of the end plate 354 is padded by applying a finish 360 of ultra high molecular weight plastic or, alternatively by attaching a resilient cushion.

Threaded onto the shaft 350 is one narrow lock nut 362 and a pair of wider hex nuts 364a–b, where the lock nut 362 is positioned between the hex nuts 364a–b and the head 352. The wider hex nuts 364a–b, are tightened on the shaft into abutting position with each other and then are welded together in that position. Thereupon, the hex nuts 364a–b are welded, still in their joined condition, to the upper plate 348 of the slide 340 so that the center axis of the elongate shaft 350 extends in parallel alignment to one of the pair of holes 364a–b formed at the lower end 344 of the slide. At the end of the shaft 350 opposite the head 352, a spaced apart pair of holes 366a–b are formed at right angles to the center axis of the shaft and to each other.

Referring to FIG. 15, to begin adjustment of each rack stop 290, where it is desired to reduce the distance available for longitudinal movement of the loaded frame, the head 352 of the rack stop is preferably raised from its initial rest position 368 to a ready position 370 in the general vicinity of the upper sill 302 of the container. To achieve this large-scale vertical movement of the head, the pin 332 is removed from its lowermost pinning position 334a, the slide 340 is moved from its lowermost sliding position 342a to an intermediate sliding position 342b, and the pin is then reinserted through the appropriate hole (i.e., 346a) in the lower end of the slide in an intermediate pinning position 334b on the adjustment member 324.

Referring again to FIG. 15, proceeding with the next adjustment step, the head 352 is extended away from the mounted portion 306 of the rack stop 290 in a forward direction 372 longitudinal of the frame 30. In particular, the longitudinal distance 305 between the head 352 and the upper sill 302 is made sufficiently small so that the frame, confined to this distance for its range of movement, cannot acquire sufficient momentum to damage either the vehicles on the frame or the container. To achieve forward extension of the head 352, an externally provided handle 374 is introduced into one or the other spaced apart holes 366a–b in the shaft 350, as shown, and the handle is turned to cause forward-moving rotation of the shaft along the inner threads of each of the hex nuts 364a–b.

When the frame shifts toward the rear endwall 294 of the container, so as to cause impact to occur between the head 352 of the rack stop 290 and the sill 302, although some measure of safeguard is provided by the padding 360, it is desirable that the force of this impact be spread over as large an area of the sill as possible to prevent damage to the sill. With the forward position 376 of the head 352 as shown in FIG. 15, one possible approach to increasing the area of impact is to remove the pin 332 from the intermediate pinning position 334b and to raise the slide 340 until the hole 346a in the lower end of the slide has reached the next to highest pinning position 334d (FIG. 16) of the adjustment member 324, whereupon the slide is repinned.

A preferable approach, however, is to first utilize the small-scale vertical movement of the head 352 that is made possible by eccentric mounting of the end plate 354 to the shaft 350. In particular, using the externally provided handle 374, the shaft 350 is rotated 180°, so that the long edge 355 of the rectangular end plate 354 that is most removed from the shaft is moved from an upwardly extended position 378 to a downwardly extended position 380. Although this temporarily moves the head 352 to a position which is not in overlap with the sill 302, this clears the way for the hole 346a at the lower end of the slide 340 to be raised to the highest pinning position 334e of the adjustment member 324, resulting in an uppermost position 382 for the head 352 and an area of impact with the sill 302 that is the maximum obtainable.

As the head is being moved by forward-moving rotation of the shaft 350, the lock nut 362 maintains its relative position with respect to the head. To lock the head 352 in its uppermost position 382 shown in FIGS. 15 and 16, the lock nut 362 is backed off from the head and firmly tightened into an abutting position 384 against the joined pair of hex nuts 364a–b. With the lock nut 362 in this abutting position 384, rearward-moving rotation of the shaft 350 is precluded, so that the head 352 cannot inadvertently back away from the sill 302.

Moreover, even if vibration or some other such cause happens to work the lock nut 362 clear of this abutting position 384, the head 352 still cannot back away from the sill 302 for any significant distance. Referring to FIG. 16, the rectangular shape of the end plate 354, and the proximity of the edge 355b of the end plate relative to the ceiling 299 when the head is in its uppermost position 382, limits rearward-moving rotation of the shaft 350 to a fraction of a complete turn thereby, in turn, limiting rearward movement of the head 352.

Referring to FIG. 14, an additional feature of the exemplary rack stop 290 is the ability of the head 352 to be pivoted about a vertical axis from a longitudinally-extending position 386 to a transversely-extending position 388. Ultimately, this makes possible engagement between the head 352 and a selected one of the pair of sidewalls 53a–b of the container 52. More particularly, as shown, when a number of collapsed frames (e.g., 30, 30' and 30") have been loaded into a single container 52, by oppositely pivoting the respective heads 352 of the outermost pair of rack stops to transversely-extending positions 388, and then extending such heads, the rearward end 64 of each frame is secured in a vise-type grip which holds each frame transversely in stable position inside the container.

Referring to FIG. 17, the outer circular curvature of the slide 340 enables pivoting of the head 352 about the vertical axis. Referring to FIG. 18, the crossed pair of holes 346a–b at the lower end of the slide 340 enable the slide to be pinned so as to maintain the head either in longitudinally-extending 386 or in transversely-extending 388 position.

While a preferred embodiment of the invention has been described, it will be recognized that alternative forms are possible within the broader principles of the present invention. Regarding the exemplary mechanism for wheeled movement 104, for example, the proportionate spacing, as between individual inner wheels 106 and groups 122 of inner wheels, can vary from that specifically shown in the drawings. Regarding the exemplary mechanism for installing the tension members 138, with some loss in economy, other types of slots, other than those defined by teeth, could conceivably be used on the upper and lower plates 140 and 141. Indeed, it is possible to interchange interconnecting elements by including, for example, lugs on the respective plates 140 and 141 and slots on the respective end portions 136 and 137 of each tension member. Regarding the exemplary mechanism for storing the wheel cradles 230, other types of latching devices besides a pivoting blade 232 could be used to secure each wheel cradle in its storage position 272. Regarding the mechanism for limiting movement of the frame, the rack stop 290 is amenable to other methods of use than the one described and modifications could be made to the rack stop to make operation automatic.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A vehicle-carrying elongate frame having transversely-spaced upright sides and an elongate wheel support affixable between said upright sides to support at least a transversely-spaced pair of wheels of a vehicle, said frame comprising:

(a) transversely-spaced first and second upright post members on respective different ones of said sides;

(b) first means for securing said wheel support to said frame in a vehicle supporting position extending between and generally perpendicular to said upright sides of said frame, said first means including first and second devices for securing first and second end portions of said wheel support to said first and second upright post members, respectively, so that said first and second upright post members jointly support said wheel support;

(c) second means for securing said elongate wheel support to said frame in a storage position wherein said wheel support extends vertically along its length upward from said first device adjacent and generally parallel to a respective one of said upright sides of said frame; and (d) said first device being vertically adjustable relative to said first upright post member.

2. A frame according to claim 1, wherein said second end portion is liftably disengageable from said second device and is pivotable upwardly about said first end portion while said first end portion is being supported by said first device so as to enable said wheel support to be positioned in said storage position.

3. A frame according to claim 1, wherein said frame is of the collapsible type so that said upright sides are alternately movable between a collapsed position, in which said upright sides are closely adjacent, and an expanded position, in which said upright sides are spaced remotely apart, wherein said second means includes means for securing each wheel support in an interposed position between said upright sides of said frame when said upright sides are in said collapsed position.

4. A frame according to claim 1, wherein each upright post member includes upper and lower portions and further including a third device, said first and second end portions of said wheel support being securable by means of said first and third devices to said lower and upper portions, respectively, of said first upright post member.

5. A frame according to claim 1 wherein said first and second end portions are movable along said first and second upright post members, respectively, while said wheel support is being supported by means of said first and second devices.

6. A vehicle-carrying elongate frame for supporting a plurality of vehicles having at least one pair of transversely-spaced wheels, said frame having transversely-spaced upright sides, said frame comprising:

(a) transversely-spaced first and second upright post members on respective different ones of said upright sides;

(b) at least one elongate wheel support affixable between said upright sides to support said pair of wheels;

(c) first means for securing said wheel support to said frame in a vehicle supporting position extending between and generally perpendicular to said upright sides of said frame, said first means including first and second devices for securing said first and second end portions of said wheel support to said first and second upright post members, respectively, so that said first and second upright post members jointly support said wheel support;

(d) second means for securing said wheel support to said frame in a storage position wherein said wheel support extends vertically along its length upward from said first device adjacent and generally parallel to a respective one of said upright sides of said frame; and (e) said first device pivotably interconnecting said first end portion of said wheel support to said first upright post member;

(f) wherein said wheel support pivots on said first device between said vehicle supporting position and said storage position;

(g) wherein said first and second end portions are movable along said first and second upright post members, respectively, while said wheel support is being supported by means of said first and second devices.

7. The frame according to claim 6, wherein said second end portion is liftably disengagable from said second device and is pivotable upwardly about said first end portion while said first end portion is being supported by said first device so as to enable said wheel support to be positioned in said storage position.

8. The frame according to claim 6, wherein said frame is collpasible so that said upright sides are alternately movable between a collapsed position, in which said upright sides are closely adjacent, and an expanded position, in which said upright sides are spaced remotely apart, wherein said second means includes means for securing said wheel support in an interposed position between said upright sides of said frame when said upright sides are in said collapsed position.

9. The frame according to claim 6, wherein each upright post member includes upper and lower portions and further including a third device, said first and second end portions of said wheel support being securable by means of said first and third devices to said lower and upper portions, respectively, of said first upright post member.

10. A vehicle-carrying elongate frame for supporting a plurality of vehicles having transverely-spaced wheels, having said frame having transverely-spaced upright sides, said frame comprising:

(a) transversely-spaced first and second upright post members on respective different ones of said sides;

(b) at least on elongate wheel support having first and second end portions;

(c) first means for securing said wheel support to said frame in a vehicle supporting position extending between and generally perpendicular to said upright sides of said frame, said first means including first and second devices for securing said first and second end portions to said first and second upright post members, respectively, so that said first and second upright post members jointly support said wheel support;

(d) second means for securing said wheel support to said frame in a storage position extending vertically along its length upward from said first device adjacent and generally parallel to a respective one of said upright sides of said frame; and (e) said second means including third means for enabling said wheel support to pivot relative to said first device between said vehicle supporting position and said storage position and fourth means for movably interconnecting said first device with said first upright post member so that said first device is vertically adjustable relative to said first upright post member.

\* \* \* \* \*

UNITED STATES PATENT AND TRADEMARK OFFICE
CERTIFICATE OF CORRECTION

PATENT NO. : 5,628,596

DATED : May 13, 1997

INVENTOR(S) : Terence Halpin et al.

It is certified that error appears in the above-indentified patent and that said Letters Patent is hereby corrected as shown below:

Col. 14, line 63    Change "55-b" to --55a-b--

Col. 20, line 34    Change "on" to --one--

Signed and Sealed this

Twenty-first Day of April, 1998

Attest:

BRUCE LEHMAN

*Attesting Officer*    *Commissioner of Patents and Trademarks*